US012375969B2

(12) United States Patent
Horn et al.

(10) Patent No.: US 12,375,969 B2
(45) Date of Patent: Jul. 29, 2025

(54) REPORTING POWER EFFICIENCY FOR COMMUNICATIONS

(71) Applicant: QUALCOMM Incorporated, San Diego, CA (US)

(72) Inventors: Idan Michael Horn, Hod Hasharon (IL); Shay Landis, Hod Hasharon (IL); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/828,863

(22) Filed: May 31, 2022

(65) Prior Publication Data

US 2023/0388845 A1   Nov. 30, 2023

(51) Int. Cl.
*H04W 28/02* (2009.01)
*H04W 28/08* (2023.01)
*H04W 28/24* (2009.01)
*H04W 72/044* (2023.01)
*H04W 72/51* (2023.01)

(52) U.S. Cl.
CPC ... *H04W 28/0221* (2013.01); *H04W 28/0967* (2020.05); *H04W 28/24* (2013.01); *H04W 72/0473* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2020/0092818 A1* | 3/2020 | Jiang | H04W 52/0261 |
| 2023/0254780 A1* | 8/2023 | Xiao | H04L 1/0003 |
| | | | 455/522 |
| 2023/0370317 A1* | 11/2023 | Kwok | H04L 27/0008 |
| 2024/0073826 A1* | 2/2024 | Zhang | H04W 52/16 |

* cited by examiner

*Primary Examiner* — Mohammad S Adhami
(74) *Attorney, Agent, or Firm* — Kevin M. Donnelly; Holland & Hart LLP

(57) ABSTRACT

Methods, systems, and devices for wireless communications are described. A wireless communication device, such as a network entity or a user equipment (UE), may transmit a message to another wireless communication device, such as a network entity, including a connection establishment request and an indication of a capability of the wireless communication device to support a value of a power efficiency threshold. The other wireless communication device may respond with signaling indicating for the wireless communication device to use a value of a power efficiency for communications between the wireless communication devices. The indication may include one or more parameters indicating the value of the power efficiency. The wireless communication devices may establish a connection in accordance with the value of the power efficiency.

30 Claims, 17 Drawing Sheets

REPORTING POWER EFFICIENCY FOR COMMUNICATIONS

TECHNICAL FIELD

The following relates to wireless communications, including reporting power efficiency for wireless communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Wireless communication systems may support channel encoding and decoding at one or more wireless communication devices, such as for communications between a UE and a network entity (for example, a base station or one of multiple components arranged in a disaggregated architecture). For example, the wireless communication devices may use a bit-interleaved coded modulation (BICM) scheme, a multi-level coding (MLC) scheme, or the like, for channel coding. However, conventional techniques for channel encoding and decoding may cause relatively high power consumption at the wireless communication devices, among other drawbacks.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes transmitting, to a second wireless communication device, a message including a connection establishment request and an indication of a capability of the first wireless communication device to support a value of a power efficiency threshold, receiving, in response to the message, signaling indicating to the first wireless communication device to use a value of a power efficiency at the first wireless communication device, the signaling including one or more parameters based on the value of the power efficiency threshold, and establishing, based on receiving the signaling, a connection with the second wireless communication device in accordance with the value of the power efficiency at the first wireless communication device.

Another innovative aspect of the subject matter described in this disclosure can be implemented in an apparatus for wireless communication. The apparatus may include a processor and memory coupled with the processor and instructions executable by the processor to cause the apparatus to transmit, to a second wireless communication device, a message including a connection establishment request and an indication of a capability of the first wireless communication device to support a value of a power efficiency threshold, receive, in response to the message, signaling indicating to the first wireless communication device to use a value of a power efficiency at the first wireless communication device, the signaling including one or more parameters based on the value of the power efficiency threshold, and establish, based on receiving the signaling, a connection with the second wireless communication device in accordance with the value of the power efficiency at the first wireless communication device.

Another innovative aspect of the subject matter described in this disclosure can be implemented in an apparatus for wireless communication. The apparatus may include means for transmitting, to a second wireless communication device, a message including a connection establishment request and an indication of a capability of the first wireless communication device to support a value of a power efficiency threshold, means for receiving, in response to the message, signaling indicating to the first wireless communication device to use a value of a power efficiency at the first wireless communication device, the signaling including one or more parameters based on the value of the power efficiency threshold, and means for establishing, based on receiving the signaling, a connection with the second wireless communication device in accordance with the value of the power efficiency at the first wireless communication device.

Another innovative aspect of the subject matter described in this disclosure can be implemented in a non-transitory computer-readable medium storing code for wireless communication. The code may include instructions executable by a processor to transmit, to a second wireless communication device, a message including a connection establishment request and an indication of a capability of the first wireless communication device to support a value of a power efficiency threshold, receive, in response to the message, signaling indicating to the first wireless communication device to use a value of a power efficiency at the first wireless communication device, the signaling including one or more parameters based on the value of the power efficiency threshold, and establish, based on receiving the signaling, a connection with the second wireless communication device in accordance with the value of the power efficiency at the first wireless communication device.

Some examples of the method, apparatuses, and non-transitory computer-readable medium described herein may further include operations, features, means, or instructions for determining the value of the power efficiency threshold based on receiving a channel state information-reference signal (CSI-RS), a demodulation reference signal (DMRS), a downlink shared channel message, or any combination thereof.

In some examples of the method, apparatuses, and non-transitory computer-readable medium described herein, inputting, to a machine learning model, a channel estimation, a whitened channel estimation, a noise variance, a noise covariance, a Doppler spread, a channel time domain impulse response, a channel after precoding, the channel before precoding, or any combination thereof and determining the value of the power efficiency threshold based on an output from the machine learning model.

Some examples of the method, apparatuses, and non-transitory computer-readable medium described herein may further include operations, features, means, or instructions for determining the value of the power efficiency threshold based on accessing a look-up table with a set of multiple power consumption values, where a maximum power consumption value of the set of multiple power consumption values corresponds to the value of the power efficiency threshold.

One innovative aspect of the subject matter described in this disclosure can be implemented in a method for wireless communication. The method includes receiving, from a second wireless communication device, a message including a connection establishment request and an indication of a capability of the second wireless communication device to support a value of a power efficiency threshold, transmitting, in response to the message, signaling indicating to the second wireless communication device to use a value of a power efficiency at the second wireless communication device, the signaling including one or more parameters based on the value of the power efficiency threshold, and establishing, based on transmitting the signaling, a connection with the second wireless communication device in accordance with the value of the power efficiency at the second wireless communication device.

Another innovative aspect of the subject matter described in this disclosure can be implemented in an apparatus for wireless communication. The apparatus may include a processor and memory coupled with the processor and instructions executable by the processor to cause the apparatus to receive, from a second wireless communication device, a message including a connection establishment request and an indication of a capability of the second wireless communication device to support a value of a power efficiency threshold, transmit, in response to the message, signaling indicating to the second wireless communication device to use a value of a power efficiency at the second wireless communication device, the signaling including one or more parameters based on the value of the power efficiency threshold, and establish, based on transmitting the signaling, a connection with the second wireless communication device in accordance with the value of the power efficiency at the second wireless communication device.

Another innovative aspect of the subject matter described in this disclosure can be implemented in an apparatus for wireless communication. The apparatus may include means for receiving, from a second wireless communication device, a message including a connection establishment request and an indication of a capability of the second wireless communication device to support a value of a power efficiency threshold, means for transmitting, in response to the message, signaling indicating to the second wireless communication device to use a value of a power efficiency at the second wireless communication device, the signaling including one or more parameters based on the value of the power efficiency threshold, and means for establishing, based on transmitting the signaling, a connection with the second wireless communication device in accordance with the value of the power efficiency at the second wireless communication device.

Another innovative aspect of the subject matter described in this disclosure can be implemented in a computer-readable medium storing code for wireless communication. The code may include instructions executable by a processor to receive, from a second wireless communication device, a message including a connection establishment request and an indication of a capability of the second wireless communication device to support a value of a power efficiency threshold, transmit, in response to the message, signaling indicating to the second wireless communication device to use a value of a power efficiency at the second wireless communication device, the signaling including one or more parameters based on the value of the power efficiency threshold, and establish, based on transmitting the signaling, a connection with the second wireless communication device in accordance with the value of the power efficiency at the second wireless communication device.

Some examples of the method, apparatuses, and non-transitory computer-readable medium described herein may further include operations, features, means, or instructions for determining the power efficiency at the second wireless communication device based on selecting a multi-level coding (MLC) scheme to maximize the power efficiency in accordance with the value of the power efficiency threshold.

DETAILED DESCRIPTION

Figure 1:
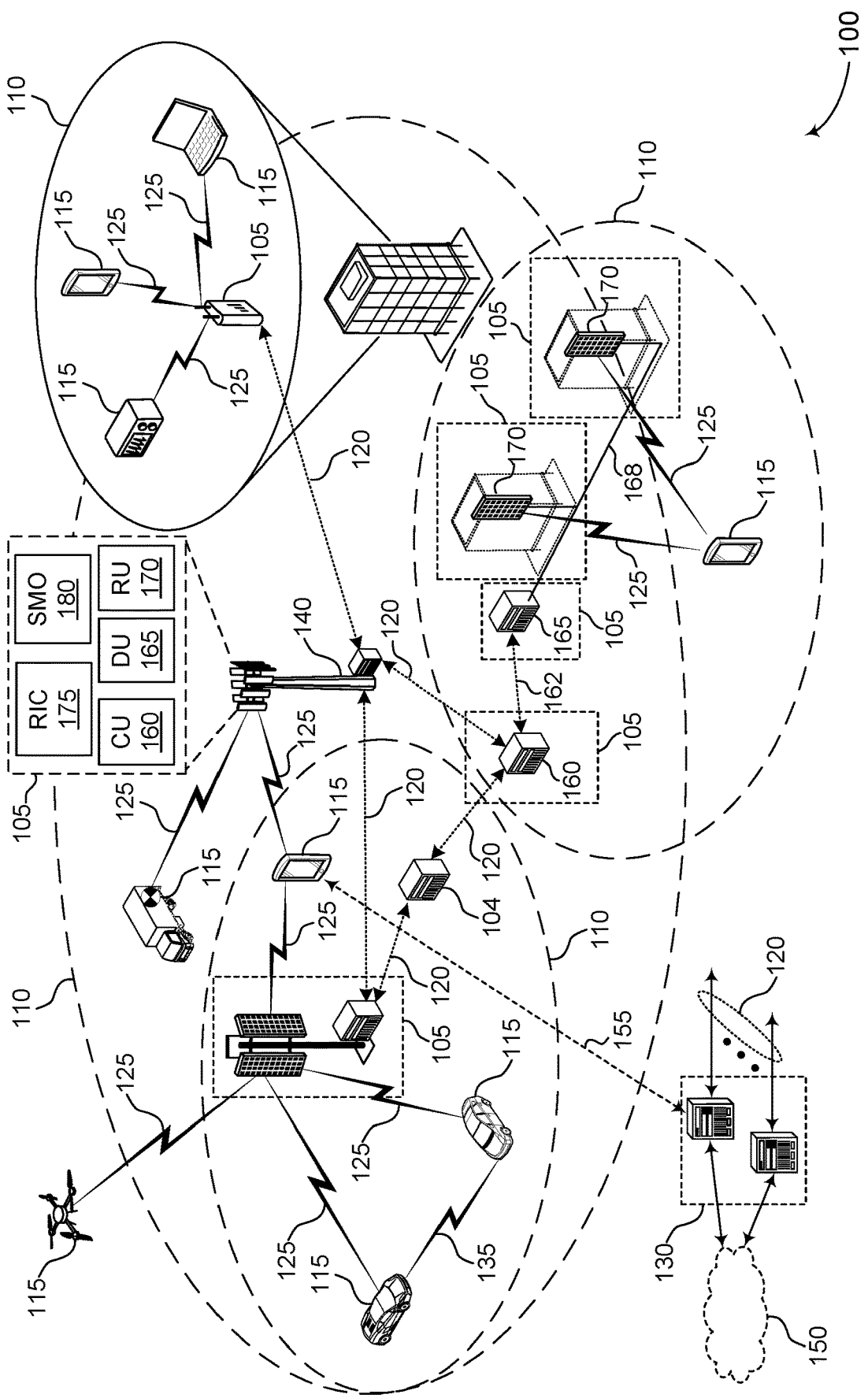
FIG. 1 illustrates an example of a wireless communications system that supports reporting power efficiency for communications in accordance with one or more aspects of the present disclosure.

In some wireless communications systems, one or more wireless communication devices (for example, a user equipment (UE) and one or more network entities) may communicate by encoding a transmission using a coding scheme. For example, the one or more wireless communication devices may use bit-interleaved coded modulation (BICM) for channel coding in which information bits are interleaved and encoded before being grouped into symbols and mapped to constellation points. BICM provides for equal error protection across bits in each symbol. In some other examples, the one or more wireless communication devices may use a multi-level coding (MLC) scheme in which the wireless communication devices may subdivide a binary representation of each symbol or labeling bits for each symbol into separate subsets of bits or coding levels. MLC provides for encoding each level using a different component code having a different code rate and, therefore, provides un-equal error protection for different bits. In some cases, MLC may increase spectral efficiency and reduce power consumption at the wireless communication devices for examples in which the parameters are properly selected for channel and reception conditions. However, there may not be a method for the wireless communication devices to exchange parameters for a relationship between the spectral efficiency and power efficiency, which may be non-linear.

Various aspects generally relate to improving power efficiency at a wireless communication device based on signaling exchanged between the wireless communication device and another wireless communication device. For example, a wireless communication device, such as a UE, may transmit a connection establishment request as part of an initial message in a radio resource control (RRC) connection procedure with another wireless communication device, such as a network entity. The wireless communication device may include a capability to support a value of a power efficiency threshold as a part of the initial message. For example, the wireless communication device may determine the value of the power efficiency threshold based on a look-up table (LUT), one or more measurements from reference signals or other signaling, a machine learning model, other techniques or information, or any combination thereof. The other wireless communication device may determine a power efficiency for the wireless communication device, and may indicate the power efficiency to the wireless communication device in signaling. Thus, based on the signaling the two wireless communication devices may establish a connection in accordance with the power efficiency at the wireless communication device.

Particular aspects of the subject matter described in this disclosure may be implemented to realize one or more of the following potential advantages. The techniques employed by the described wireless communication devices (for example, the UEs and the network entities) provide improved power efficiency for battery life and energy consumption in a wireless communications system based on power efficiency reporting and configuring of the power efficiency. The wireless communication device reporting a supported value of a power efficiency threshold to another wireless communication device will provide for the other wireless communication device to select and use a value of a power efficiency that satisfies the supported value of the power efficiency threshold, which will improve link spectral efficiency, and in turn, reduce the power consumption of the wireless communication devices. Reducing the power of the wireless communication devices will increase overall system efficiency and reduce overall energy consumption, among other additional benefits.

Aspects of the disclosure are initially described in the context of wireless communications systems. Aspects of the disclosure are further described in the context of coding diagrams and process flows. Aspects of the disclosure are further illustrated by and described with reference to apparatus diagrams, system diagrams, and flowcharts that relate to reporting power efficiency for communications.

FIG. 1 illustrates an example of a wireless communications system 100 that supports reporting power efficiency for communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending upon which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communications systems (for example, wireless communications system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

For instance, an access network (AN) or RAN may include communications between access nodes (for example, an IAB donor), IAB nodes 104, and one or more UEs 115. The IAB donor may facilitate connection between the core network 130 and the AN (for example, via a wired or wireless connection to the core network 130). That is, an IAB donor may refer to a RAN node with a wired or wireless connection to core network 130. The IAB donor may include a CU 160 and at least one DU 165 (for example, and RU 170), in which case the CU 160 may communicate with the core network 130 via an interface (for example, a backhaul link). IAB donor and IAB nodes 104 may communicate via an F1 interface according to a protocol that defines signaling messages (for example, an F1 AP protocol). Additionally, or alternatively, the CU 160 may communicate with the core network via an interface, which may be an example of a portion of backhaul link, and may communicate with other CUs 160 (for example, a CU 160 associated with an alternative IAB donor) via an Xn-C interface, which may be an example of a portion of a backhaul link.

An IAB node 104 may refer to a RAN node that provides IAB functionality (for example, access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (for example, an IAB donor may relay transmissions for UEs—one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (for example, DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (for example, a backhaul communication link 120) to the core network 130 and may act as parent node to IAB nodes 104. For example, the DU 165 of IAB donor may relay transmissions to UEs 115—IAB nodes 104, and may directly signal transmissions to a UE 115. The CU 160 of IAB donor may signal communication link establishment via an F1 interface to IAB nodes 104, and the IAB nodes 104 may schedule transmissions (for example, transmissions to the UEs 115 relayed from the IAB donor)—the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reporting power efficiency for communications as described herein. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless communication device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communications system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communications (for example, in an FDD mode) or may be configured to carry downlink and uplink communications (for example, in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communications system 100 (for example, the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communications resource may refer to a combination of an RF spectrum resource, a time resource, and a spatial resource (for example, a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, a quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (for example, using a carrier) and may be associated with an identifier for distinguishing neighboring cells (for example, a physical cell identifier (PCID), a virtual cell identifier (VCID), or others). In some examples, a cell also may refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered network entity 105 (for example, a lower-powered base station 140), as compared with a macro cell, and a small cell may operate using the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communications may be within the coverage area 110 of a network entity 105 (for example, a base station 140, an RU 170), which may support aspects of such D2D communications being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred—the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (for example, from 30 GHz to 300 GHz), also known as the millimeter band. In some examples, the wireless communications system 100 may support millimeter wave (mmW) communications between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communications with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information-reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, one or more wireless communication devices (for example, a UE 115 and one or more network entities 105) may communicate by encoding a transmission using a coding scheme. For example, the wireless communication device may use an MLC scheme in which a wireless communication devices may subdivide a binary representation of each symbol or labeling bits for each symbol into separate subsets of bits or coding levels. MLC may provide for encoding each level using a different component code having a different code rate and, therefore, provide un-equal error protection for different bits. In some cases, MLC may increase spectral efficiency and reduce power consumption at the wireless communication devices when the parameters are selected for channel and reception conditions. However, there may not be a method for the wireless communication devices to exchange parameters for a relationship between the spectral efficiency to power efficiency, which may not be linear.

In some examples, a wireless communication device, such as a UE 115, may transmit a connection establishment request as part of an initial message in a RRC connection procedure with another wireless communication device, such as a network entity 105. The wireless communication device may include a capability to support a value of a power efficiency threshold as a part of the initial message. For example, the wireless communication device may determine the power efficiency threshold based on a LUT, one or more measurements from reference signals or other signaling, a machine learning model, or any combination thereof. The other wireless communication device may determine a power efficiency for the wireless communication device, and may indicate the power efficiency in signaling. Thus, the two wireless communication devices may establish a connection in accordance with the power efficiency at the wireless communication device.

Figure 2A:
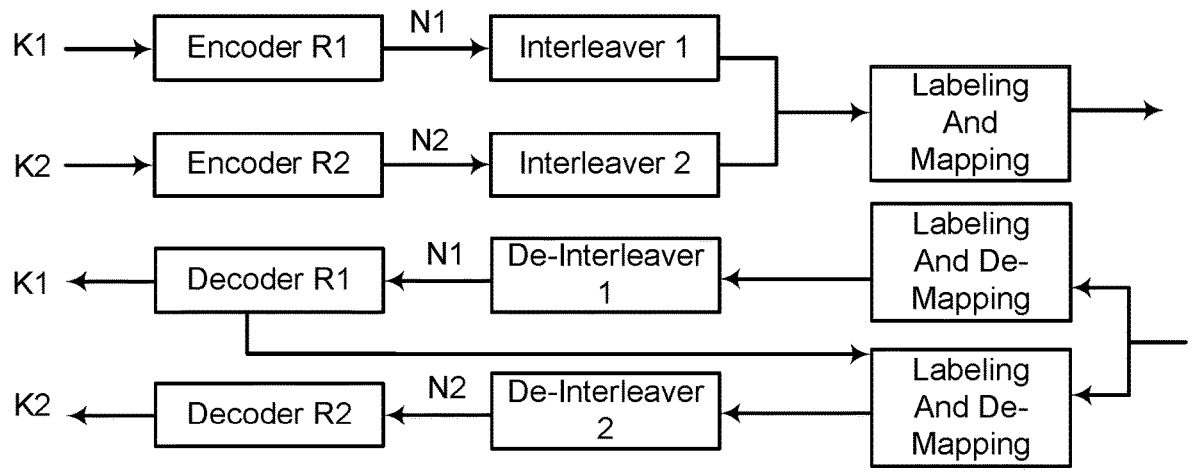
FIGS. 2A and 2B illustrates examples of coding diagrams that support reporting power efficiency for communications in accordance with one or more aspects of the present disclosure.
Figure 2B:
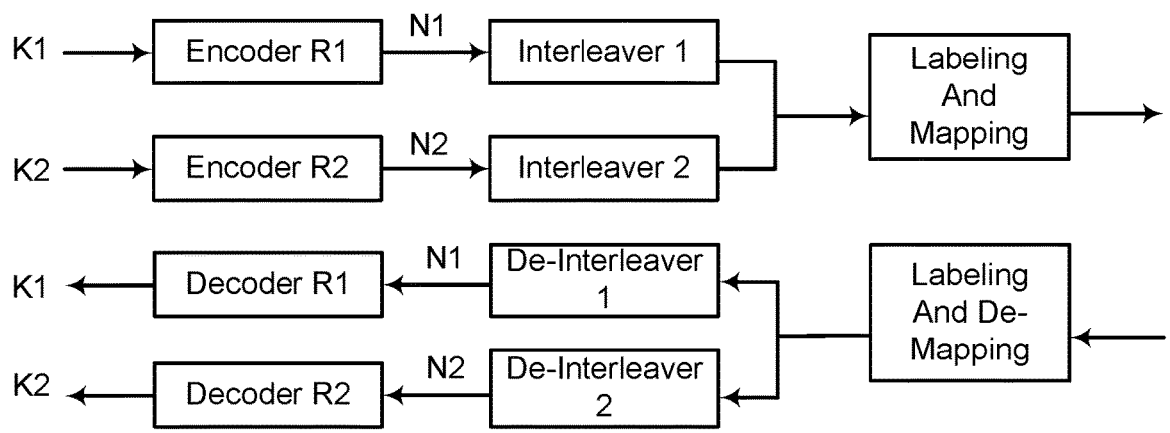

FIGS. 2A and 2B illustrate examples of a coding diagram 200-*a* and a coding diagram 200-*b,* respectively, that support reporting power efficiency for communications in accordance with one or more aspects of the present disclosure. In some examples, the coding diagram 200-*a* and the coding diagram 200-*b* may implement aspects of the wireless communications system 100. For example, the coding diagram 200-*a* and the coding diagram 200-*b* may be implemented by a wireless communications system in which one or more wireless communication devices use a MLC scheme to encode and decode a transmission, including examples in which the wireless communication devices may be examples of one or more network entities, one or more UEs, or both as described with reference to FIG. 1.

In some examples, a wireless communication device, such as a UE or a network entity, may encode or decode a channel in a channel coding procedure. The channel may carry data, control signaling, or both between wireless communication devices. For example, the wireless communication device may encode and transmit data or control signaling to a network entity or a UE via the channel. Similarly, the network entity or other UE may receive and decode the data or control signaling from the wireless communication device. The decoding of the channel code may be a relatively high power-consuming tasks in a reception process, such as for one or more bandwidths with high data rates (for example, frequency bands like Frequency Range 4 (FR4), which may include 2 GHz to 3.5 GHz, and Frequency Range 5 (FR5), which may include 95 GHz to 325 GHz). For example, a decoder, such as a low-density parity-check (LDPC) decoder, may have a relatively high power consumption, which may be due to having a relatively high throughput. In some examples, improving power efficiency at the wireless communication device during the channel coding procedure may reduce power consumption at the wireless communication device.

There may be one or more different channel coding procedures, which the wireless communication device may implement. For example, the wireless communication device may use BICM for channel coding. In BICM one or more information bits may be interleaved and encoded prior to being grouped into symbols and mapped to constellation points. This process may cause equal error protection across bits in each symbol. However, different bits in a symbol labeling may experience different error probability, and thus, may benefit from different levels of protection. Therefore, in some other examples, the wireless communication device may use MLC for channel coding to achieve un-equal error protection.

In MLC, a wireless communication device may subdivide a binary representation of each symbol, or the labeling bits for the symbol, into a separate subsets of bits or coding levels, (corresponding to different component codes), such that the summation of all levels bit count is equal to the amount of bits in the original symbol labeling. For example, as illustrated in FIG. 2A and FIG. 2B, the wireless communication device may subdivide a symbol into a first subset of bits, K1, for a first coding level and a second subset of bits, K2, for a second coding level. As a result, MLC may provide for a wireless communication device to encode each level using a different component code having a different code rate, and therefore provide un-equal protection for different bits. In MLC, there may be multiple methods for labeling the symbol, division into coding levels, and decoding strategies across the coding levels. For example, one or more wireless communication device may implement a 2-Level MLC including examples in which a first level is LDPC coded, while a second level may be left un-coded, or coded with low complexity code, such as Reed-Solomon, to reduce power consumption at the wireless communication devices.

As illustrated in FIG. 2A and FIG. 2B, the wireless communication device may input the subsets of bits into one or more encoders at different coding levels, and then use the output as an input to one or more interleavers. For example, the wireless communication device may input the subset of bits K1 into the encoder R1, which may provide an output, N1, to input to the interleaver 1. Similarly the wireless communication device may input the subset of bits K2 into the encoder R2, which may provide an output, N2, to input to the interleaver 2. The wireless communication device may label and map the interleaved bits for transmission to a receiving wireless communication device.

In some examples, the coding diagram 200-a may illustrate an example of a multi-stage decoding (MSD) strategy across the coding levels. For example, a wireless communication device may perform MSD of an MLC level based on knowledge obtained from decoding one or more previous levels, which may include partitioning information. The wireless communication device may label and de-map received symbols and input the labeled and de-mapped symbols into a de-interleaver 1 to obtain N1 at a first MLC level. The wireless communication device may input N1 to a decoder R1 to obtain K1. Then, after decoding the first MLC level, the wireless communication device may use the partitioning information from the first level to decoding a second MLC level. For example, the wireless communication device may use the partitioning information to label and de-map additional symbols, use the labelled and de-mapped symbols as an input to a de-interleaver 2 to obtain N2, and input N2 to the decoder R2 to obtain K2.

In some other examples, the coding diagram 200-b may illustrate an example of a parallel independent decoding (PID) strategy across coding levels. For example, a wireless communication device may decode each MLC level independently without applying the knowledge obtained from a previous level decoding, including examples in which there may be no subset partitioning. That is, the wireless communication device may label and de-map one or more received symbols, input the labeled and de-mapped symbols into a de-interleaver 1 and de-interleaver 2 to obtain N1 and N2, and decode N1 and N2 using decoder R1 and R2 to obtain K1 and K2, respectively. The wireless communication device may determine to use a channel coding method (for example, a MSD or a PID strategy) according to one or more factors, such as a channel type and a working signal-to-noise ratio (SNR) point to increase spectral efficiency. A wireless communication device may use different MLC decoding methods for different scenarios and channel conditions. For an additive white Gaussian noise (AWGN) channel, the wireless communication device may implement the MSD approach, while for a fading channel, the wireless communication device may implement the PID approach. In some cases, a number of bits and selected code rates for each level may be adjusted for different SNR regions to maximize a spectral efficiency.

Thus, using a MLC scheme may increase spectral efficiency, such as examples in which a wireless communication device selects one or more MLC parameters for channel and reception conditions. Using the MLC scheme with a relatively low power consumption decoder (for example, Reed Solomon, BCH or even un-coded) on the lowest level, such as a most significant bit (MSB), may reduce power consumption at the wireless communication device, especially for relatively large bandwidths. However, a relation between spectral efficiency and power efficiency may not linear in a wireless communications system, and may utilize assistance from one or more wireless communication devices within the system. Thus, in some examples, a wireless communication device may provide a report to the network (for example, a UE may provide a report to a network entity) including a value for a power efficiency threshold, which may be referred to as a gap from spectral efficiency to power efficiency. The report may assist the network entity, such as during Outer Loop Link Adaptation (OLLA) to improve power consumption at the wireless communication device.

Figure 3:
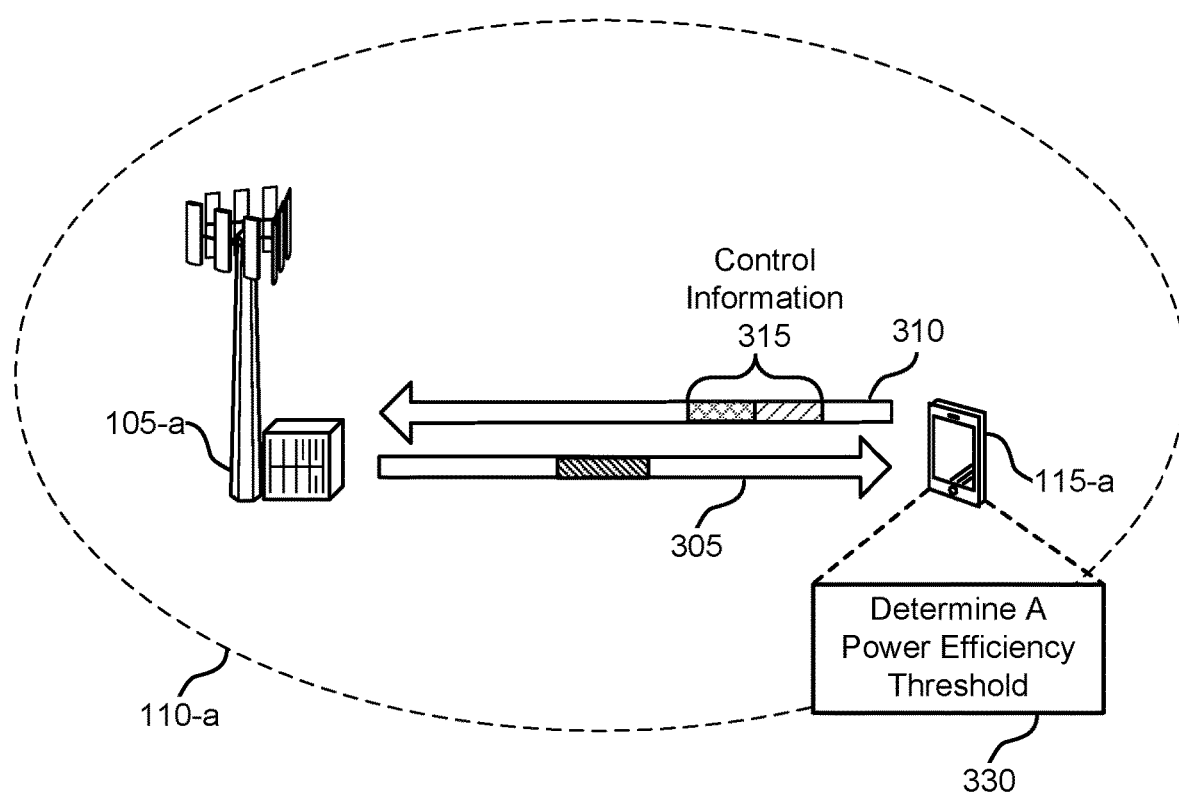
FIG. 3 illustrates an example of a wireless communications system that supports reporting power efficiency for communications in accordance with one or more aspects of the present disclosure.

FIG. 3 illustrates an example of a wireless communications system 300 that supports reporting power efficiency for communications in accordance with one or more aspects of the present disclosure. The wireless communications system 300 may implement or be implemented to realize aspects of the wireless communications system 100, the coding diagram 200-a, and the coding diagram 200-b. For example, the wireless communications system 300 illustrates communication between one or more UEs and network entities, such as a UE 115-a and a network entity 105-a with a cover area 110-a, which may be examples of corresponding devices described herein, including with reference to FIG. 1. The wireless communications system 300 may support signaling from a UE 115-a that may indicate a capability of the UE 115-a to support a value of a power efficiency threshold.

In some examples, a network entity may perform the functions described as being performed by the UE 115-a. In some cases, the UE 115-a and the network entity 105-a may be in communication. For example, the network entity 105-a may transmit control information, data, or both to the UE 115-a via a downlink communication link 305. Similarly, the UE 115-a may transmit control information, data, or both to the network entity 105-a via an uplink communication link 310.

In some examples, one or more wireless communication devices (for example, the UE 115-a and the network entity 105-a) may communicate by encoding a transmission using a coding scheme. For example, the wireless communication devices may use a MLC scheme, as described with reference to FIG. 2A and FIG. 2B, to encode and decode a transmission. In some cases, MLC may increase spectral efficiency and reduce power consumption at the wireless communication devices for examples in which the parameters are selected for channel and reception conditions. In some cases, a network entity may determine a link spectral efficiency based on a channel state feedback (CSF) report from one or more wireless communication devices and an OLLA algorithm. For example, the network entity may raise a downlink modulation and coding scheme (MCS) for a downlink shared channel, such as a physical downlink shared channel (PDSCH), until cyclic redundancy check (CRC) failure occurs. However, there may not be a method for the wireless communication devices to exchange parameters for a relationship between the spectral efficiency to power efficiency, which may not be linear. That is, the network entity may not have the knowledge of how to determine a power consumption at a wireless communication device, because the wireless communication device may not signal a power consumption distribution to the network entity.

In some cases, a UE 115-a, or a network entity, may define a report, which may be referred to as a gap from power efficiency report, to assist a network entity 105-a in OLLA to obtain a power consumption for the UE 115-a, which may improve a battery life at the UE 115-a and overall power efficiency of the wireless communications system 300. The UE 115-a may add the defined report to a channel quality indicator (CQI) report, a precoding matrix indicator (PMI) report, a rank indicator (RI) report, or any combination thereof to assist the network entity 105-a in determining a value of power efficiency for the UE 115-a. For example, the UE 115-a may transmit control information 315 to the network entity 105-a via the uplink communication link 310. The control information 315 may include a first message in an RRC connection establishment procedure, which may be included in RRC signaling. For example, the control information 315 may include a connection establishment request 320.

In some cases, at connection establishment, the UE 115-a may also report a capability to support a value of a threshold power efficiency, or a gap to power efficiency, in RRC signaling. For example, the UE 115-a may include power efficiency capability signaling 325 in the control information 315 with the connection establishment request 320. The power efficiency capability signaling 325 may include one or more parameters. The one or more parameters may define a gap value between a current power efficiency value and a maximum power efficiency value supported by the UE 115-a. The UE 115-a may report the gap in the form of a value of a power efficiency threshold, including examples in which the threshold is based on the maximum power efficiency value supported by the UE 115-a. For example, at 330, the UE 115-a may determine a power efficiency threshold to indicate in the power efficiency capability signaling 325. In some cases, the UE 115-a may use a LUT with prior knowledge of a radio frequency power consumption, digital front end power consumption, digital power consumption, or any combination thereof. For example, the UE 115-a may select a lowest value of power consumption from the LUT. In some cases, the lowest value of power consumption may indicate a maximum power efficiency value supported by the UE 115-a, such as when there may be a same spectral efficiency or throughput (for example, because power efficiency may be a ratio between spectral efficiency and power consumption).

Additionally, or alternatively, the UE 115-a may estimate a value for the power efficiency threshold according to one or more reference signals, such as received channel state information-reference signals (CSI-RSs) and demodulation reference signals (DMRSs), or one or more downlink shared channel transmissions, such as PDSCH transmissions. The UE 115-a may estimate one or more noise samples, and may create multiple transmit vectors with different configurations, such as multiple MLC mappings, such that each transmit vector may have a different configuration. The UE 115-a may test each vector with a receiver modem to determine a configuration that maximizes a power efficiency. For example, each vector may experience a different decoder power consumption rate based on a number of iterations and other factors, and the UE 115-a may select the configuration with a relatively low power consumption rate (for example, the UE 115-a may choose a highest power efficiency, which may not be the lowest power consumption). At 330, the UE 115-a may select a configuration that maximizes the power efficiency, and may indicate a value of the maximum power efficiency, or the power efficiency threshold, to the network entity 105-a. In some cases, the UE 115-a may periodically estimate the value for the power efficiency threshold, such as once for each CSF report, such that a power consumption for the estimation may be negligible compared to an average data slot power consumption.

In some examples, at 330, the UE 115-a may use artificial intelligence (AI) to determine the power efficiency threshold. For example, the UE 115-a my input a channel estimation, a whitened channel estimation, a noise variance, a noise covariance, a Doppler spread, a channel time domain impulse response, a channel after precoding, the channel before precoding, or any combination thereof to a machine learning model. The UE 115-a may determine the power efficiency threshold as the output from the machine learning model. In some examples, the UE 115-a may train the machine learning model. Additionally, or alternatively, the network entity 105-a may configure the UE 115-a with a trained machine learning model.

In some examples, the machine learning model may be an example of a deep learning machine learning model, including examples in which a deep learning machine learning model may include multiple layers of operations between input and output. For example, the machine learning model may represent a convolution neural network (CNN) model, a recurrent neural network (RNN) model, a generative adversarial network (GAN) model, or any other deep learning or other neural network model. In some examples, the machine learning model may represent a subset of RNN models, such as an long short-term memory (LSTM) model, including examples in which an LSTM model may involve learning and memorizing long-term dependencies over time to make predictions based on time series data. For example, the machine learning model may include an LSTM cell with a time-series input, and may transfer outputs from the LSTM cell into additional instances of the cell over time for selectively updating machine learning model values to make predictions. In some examples, the machine learning model may predict whether a power efficiency threshold may remain preferred compared to a last power efficiency threshold based on historical measurements.

In some examples, the network entity 105-a, the UE 115-a, or both may train an machine learning model using a learning approach. For example, the network entity 105-a, the UE 115-a, or both may train an machine learning model using supervised, semi-supervised, or unsupervised learning. Supervised learning may involve machine learning model training based on labeled training data, which may include example input-output pairs, whereas unsupervised learning may involve machine learning model training based on unlabeled training data, including data without example input-output pairs. Semi-supervised learning may involve a small amount of labeled training data and a large amount of unlabeled training data. In some cases, the machine learning model may use supervised learning for power efficiency threshold prediction.

In some examples, the gap value, or the value of the power efficiency threshold, may be in the units of MCS or CQI, or in average code rate (for example, averaged on each layer of a MLC scheme). Additionally, or alternatively, the UE 115-a may indicate the gap in the labeling of the MLC scheme used (for example, BICM, MSD, or PID), in the number of bits per layer, such that the UE 115-a may report a number of bits for each layer of the MLC scheme, or both. In some examples, the power efficiency capability signaling 325 may include one or more parameters to indicate whether a layer (for example, a second layer) of the MLC scheme should be coded or un-coded, a RI parameter, such that the UE 115-a may request to reduce or increase the rank of a transmission for improved power efficiency, a constellation parameter, such that the UE 115-a may request a constellation that may reduce a power consumption at the UE 115-a (for example, an amplitude phase shift keying (APSK) constellation may reduce the complexity of phase noise and nonlinearity mitigation), or any combination thereof. In some cases, the UE 115-a may include one or more additional parameters in the power efficiency capability signaling, such as a power efficiency for one or more sleeping modes, a desired resource allocation, or both.

In some examples, the UE 115-a may receive one or more CSI-RSs, and may calculate a CSF report along with the power efficiency capability. The UE 115-a may transmit the CSF report and the power efficiency capability signaling 325 in a same or different message to the network entity 105-a. The network entity 105-a may use the CSF report and the power efficiency capability signaling 325 to determine a value of a power efficiency to indicate to the UE 115-a. For example, the UE 115-a may report a CQI that may be equivalent to a code rate of 0.8 with a 256 quadrature amplitude modulation (QAM) and a gap to power efficiency of 1, 2, . . . CQI, which may translate to a lower code rate of 0.7 rather than 0.8. Thus, the network entity 105-*a* may not raise a code rate above 0.7 in an OLLA (for example, even though the CRC may pass for higher rates). Instead, the OLLA may search for an MLC mapping that maximizes the power efficiency for the UE 115-*a*. For example, the network entity 105-*a* may search one or more MLC options that apply to the code rate, such as a first layer at a code rate of 0.4, 0.5, or 0.6 and a second layer at a code rate of 0.8, 0.9, or 1 (un-coded). In some cases, the UE 115-*a* may include a desired number of bits for the first layer or may include whether the second layer should be un-coded in the power efficiency capability signaling 325.

In some examples, the network entity 105-*a* may determine one or more dedicated pilot symbols (for example, time resources) to add to a CSI-RS slot for the power efficiency capability signaling 325. For example, the network entity 105-*a* may add one or more pilot symbols that may be relatively similar to a data path, such as DMRS pilot symbols multiplexed with time domain phase tracking reference signals (PTRSs). The UE 115-*a* may use the pilot symbols to estimate a channel response and to mitigate the phase noise in the time domain, such as for the sub-Terahertz (THz) frequencies. For example, the UE 115-*a* may use the pilot symbols for both channel equalization and for phase noise mitigation similar to the data path. After the phase noise mitigation, the UE 115-*a* may estimate a residual noise for the search for the MLC mapping.

In some examples, the network entity 105-*a* may transmit a power efficiency indication 335 to the UE 115-*a* based on receiving the power efficiency capability signaling 325. For example, the network entity 105-*a* may transmit signaling via the downlink communication link 305 indicating a value of a power efficiency to use at the UE 115-*a* based on the OLLA at the network entity 105-*a*. The UE 115-*a* may establish a connection with the network entity 105-*a* in accordance with the value of the power efficiency. For example, the UE 115-*a* may anticipate that the network entity 105-*a* and the UE 115-*a* may exchange signaling at a power value that may not exceed the value of the power efficiency indication 335.

Figure 4:
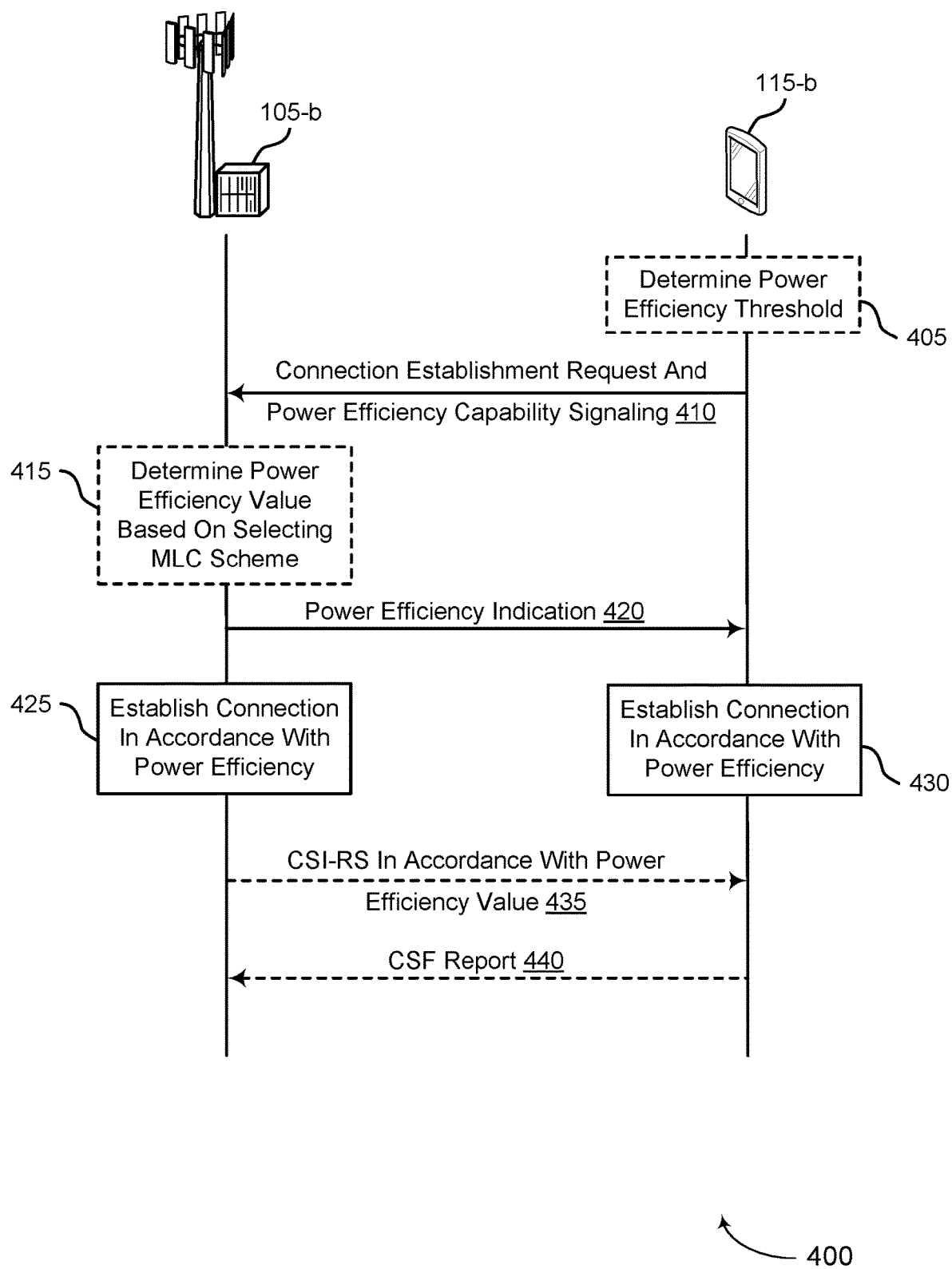
FIG. 4 illustrates an example of a process flow that supports reporting power efficiency for communications in accordance with one or more aspects of the present disclosure.

FIG. 4 illustrates an example of a process flow 400 that supports reporting power efficiency for communications in accordance with one or more aspects of the present disclosure. In some examples, the process flow 400 may implement aspects of the wireless communications system 100, the coding diagram 200-*a*, the coding diagram 200-*b*, and the wireless communications system 300. The process flow 400 may illustrate an example of a UE 115-*b* transmitting a control information including a connection establishment request and power efficiency capability to a network entity 105-*b*. The network entity 105-*b* and the UE 115-*b* may be examples of a network entity 105 and a UE 115 as described with reference to FIGS. 1 and 3. Alternative examples of the following may be implemented, including examples in which some processes are performed in a different order than described or are not performed. In some cases, processes may include additional features not mentioned below, or further processes may be added.

The actions described as being performed by the UE 115-*b* may additionally, or alternatively, be performed by a network entity.

At 405, the UE 115-*b* may determine a power efficiency threshold, or a gap to power efficiency value, for communications between the UE 115-*b* and the network entity 105-*b*. For example, the UE 115-*b* may determine the power efficiency threshold based on receiving a CSI-RS, a DMRS, a downlink shared channel message, or any combination thereof. The UE 115-*b* may measure a noise of the CSI-RS, the DMRS, the downlink shared channel message, or any combination thereof. The UE 115-*b* may generate transmit vectors based on the measured noise, including examples in which each transmit vector may have a different power efficiency configuration. The UE 115-*b* may select the power efficiency threshold by comparing the power efficiency configurations of the transmit vectors.

In some cases, the UE 115-*b* may input a channel estimation, a whitened channel estimation, a noise variance, a noise covariance, a Doppler spread, a channel time domain impulse response, a channel after precoding, the channel before precoding, or any combination thereof to a machine learning model. The UE 115-*b* may determine the power efficiency threshold as an output from the machine learning model.

In some examples, the UE 115-*b* may determine the power efficiency threshold based on accessing a LUT with multiple power consumption values, including examples in which the power efficiency threshold may be a maximum power consumption value of the power consumption values in the LUT.

At 410, UE 115-*b* may transmit a message including a connection establishment request and an indication of a capability of the UE 115-*b* to support a value of a power efficiency threshold the network entity 105-*b*. In some cases, the message may include a CQI report, a PMI report, a RI report, or any combination thereof. In some examples, the message may include an MCS parameter, a CQI parameter, a MLC parameter, a number of bits per layer, a coding status of a second layer, a RI, a constellation, or any combination thereof that satisfy the value of the power efficiency threshold. In some examples, the UE 115-*b* may transmit the message in RRC signaling.

At 415, the network entity 105-*b* determine a power efficiency at the UE 115-*b* based on selecting a MLC scheme to maximize the power efficiency, while satisfying the power efficiency threshold.

At 420, the UE 115-*b* may receive signaling from the network entity 105-*b*, the signaling indicating for the UE 115-*b* to use a value of a power efficiency. In some cases, the power efficiency indication may include one or more parameters for coding based on the power efficiency threshold. For example, the one or more parameters may indicate a MCS, CQI, MLC scheme, RI, constellation, a number of bits per layer in the MLC, or any combination thereof. Additionally, or alternatively, the one or more parameters may include a first quantity of time resources to add to time resource allocated to a CSI-RS, a second quantity of time resources for a sleeping mode at the UE 115-*b*, a time-frequency resource allocation, or any combination thereof.

At 425 and 430, the network entity 105-*b* and the UE 115-*b*, respectively, may establish a connection for communications in accordance with the power efficiency at the UE 115-*b*.

At 435, the UE 115-*b* may receive a CSI-RS using a receive power that is in accordance with the value of the power efficiency at the UE 115-*b*. In some cases, the UE 115-*b* may receive the CSI-RS from the network entity 105-*b*. In some other cases, the UE 115-*b* may receive the CSI-RS from another wireless communication device.

At 440, the UE 115-*b* may transmit a CSF report to the network entity 105-*b* based on measuring one or more values from the CSI-RS.

Figure 5:
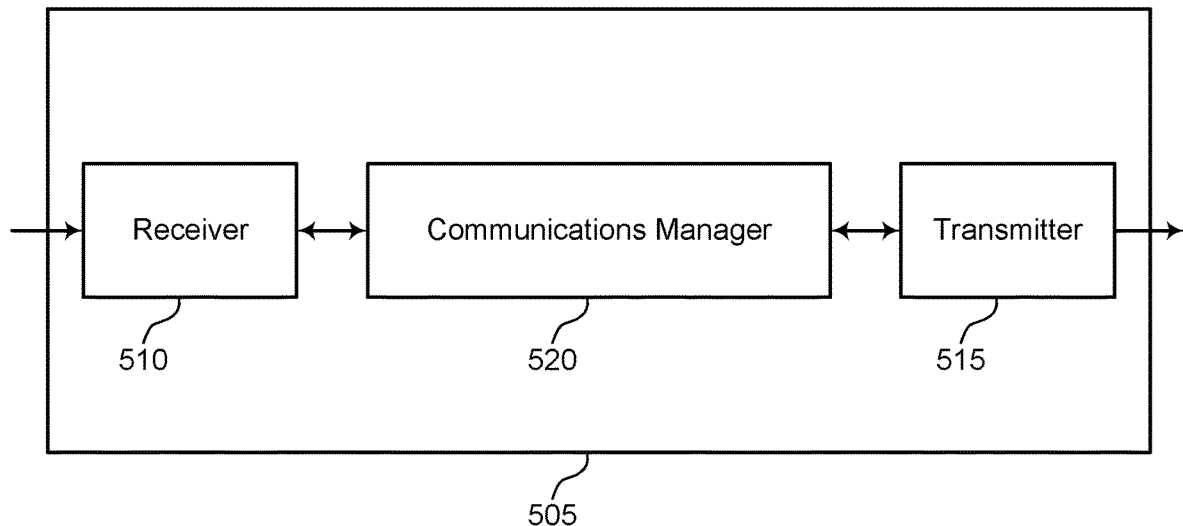
FIGS. 5 and 6 show block diagrams of devices that support reporting power efficiency for communications in accordance with one or more aspects of the present disclosure.

FIG. 5 shows a block diagram of a device 505 that supports reporting power efficiency for communications in accordance with one or more aspects of the present disclosure. The device 505 may be an example of aspects of a UE 115 as described herein. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to reporting power efficiency for communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to reporting power efficiency for communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reporting power efficiency for communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (for example, in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 520 may be configured to perform various operations (for example, receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first wireless communication device in accordance with examples as disclosed herein. For example, the communications manager 520 may be configured as or otherwise support a means for transmitting, to a second wireless communication device, a message including a connection establishment request and an indication of a capability of the first wireless communication device to support a value of a power efficiency threshold. The communications manager 520 may be configured as or otherwise support a means for receiving, in response to the message, signaling indicating to the first wireless communication device to use a value of a power efficiency at the first wireless communication device, the signaling including one or more parameters based on the value of the power efficiency threshold. The communications manager 520 may be configured as or otherwise support a means for establishing, based on receiving the signaling, a connection with the second wireless communication device in accordance with the value of the power efficiency at the first wireless communication device.

By including or configuring the communications manager 520 in accordance with examples as described herein, the device 505 (for example, a processor controlling or otherwise coupled with the receiver 510, the transmitter 515, the communications manager 520, or a combination thereof) may support techniques for a UE to transmit control information including a connection establishment request and power efficiency capability to a network entity, which may provide for reduced power consumption, more efficient utilization of communication resources, and the like.

Figure 6:
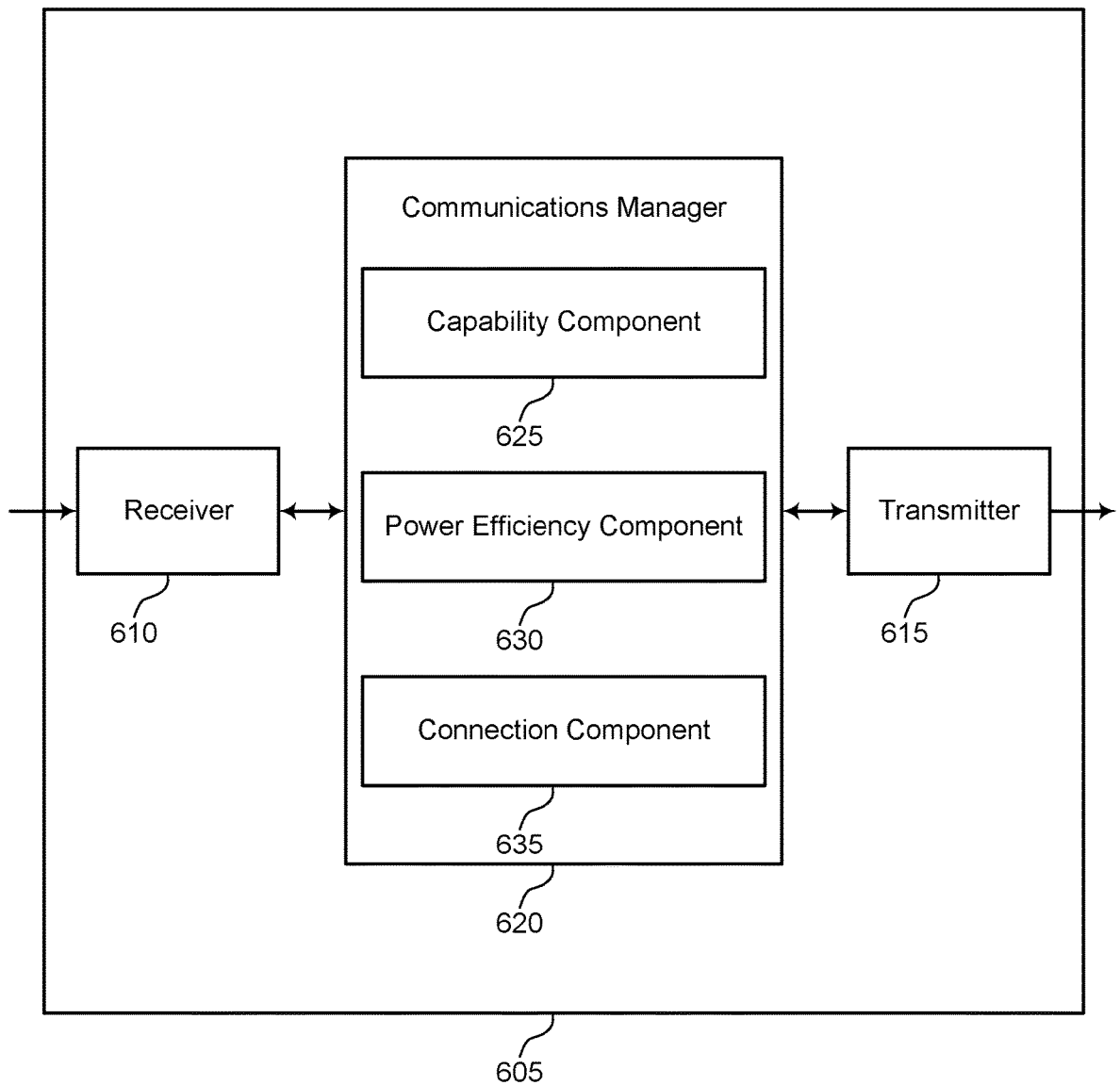

FIG. 6 shows a block diagram of a device 605 that supports reporting power efficiency for communications in accordance with one or more aspects of the present disclosure. The device 605 may be an example of aspects of a device 505 or a UE 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to reporting power efficiency for communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to reporting power efficiency for communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reporting power efficiency for communications as described herein. For example, the communications manager 620 may include a capability component 625, a power efficiency component 630, a connection component 635, or any combination thereof. In some examples, the communications manager 620, or various components thereof, may be configured to perform various operations (for example, receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless communication device in accordance with examples as disclosed herein. The capability component 625 may be configured as or otherwise support a means for transmitting, to a second wireless communication device, a message including a connection establishment request and an indication of a capability of the first wireless communication device to support a value of a power efficiency threshold. The power efficiency component 630 may be configured as or otherwise support a means for receiving, in response to the message, signaling indicating to the first wireless communication device to use a value of a power efficiency at the first wireless communication device, the signaling including one or more parameters based on the value of the power efficiency threshold. The connection component 635 may be configured as or otherwise support a means for establishing, based on receiving the signaling, a connection with the second wireless communication device in accordance with the value of the power efficiency at the first wireless communication device.

Figure 7:
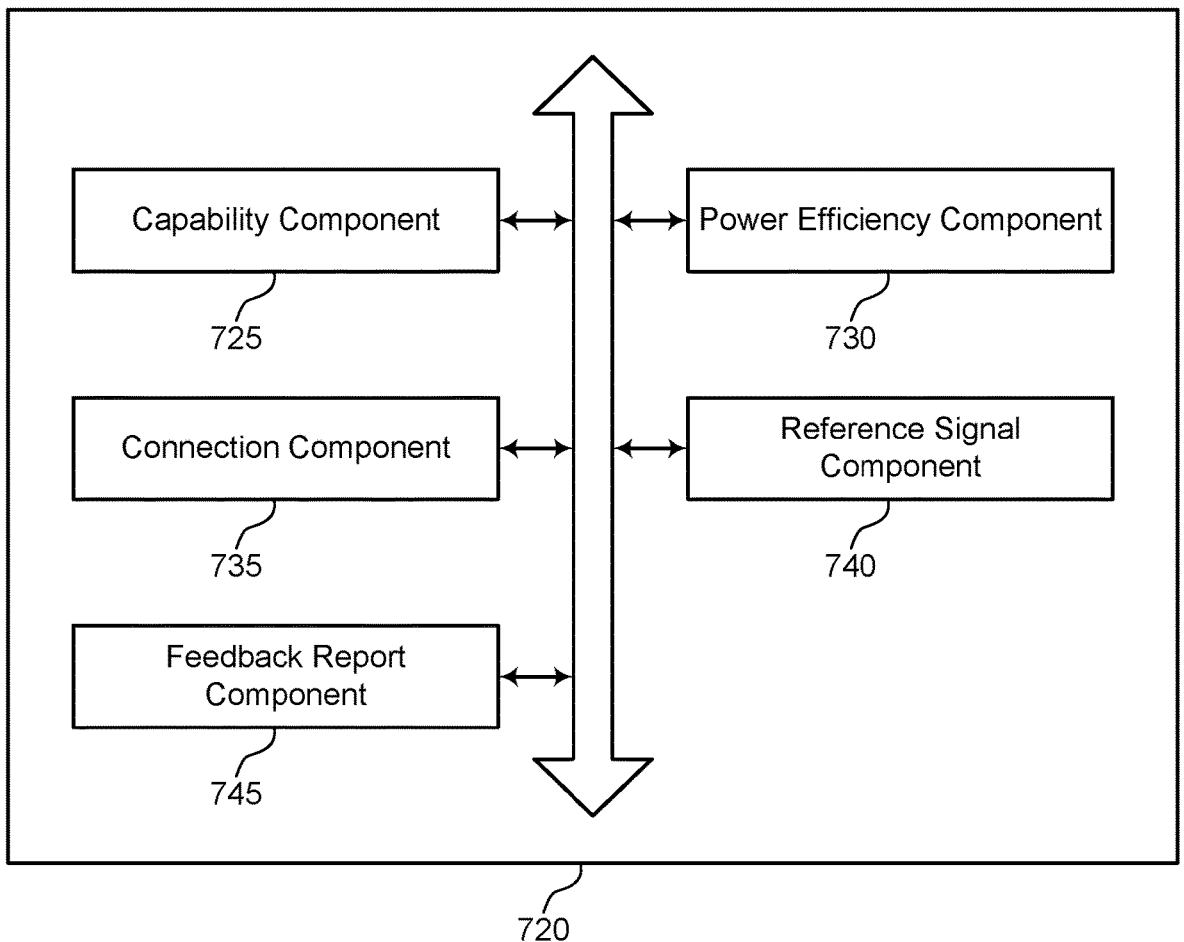
FIG. 7 shows a block diagram of a communications manager that supports reporting power efficiency for communications in accordance with one or more aspects of the present disclosure.

FIG. 7 shows a block diagram of a communications manager 720 that supports reporting power efficiency for communications in accordance with one or more aspects of the present disclosure. The communications manager 720, or various components thereof, may be an example of means for performing various aspects of reporting power efficiency for communications as described herein. For example, the communications manager 720 may include a capability component 725, a power efficiency component 730, a connection component 735, a reference signal component 740, a feedback report component 745, or any combination thereof. Each of these components may communicate, directly or indirectly, with one another (for example, via one or more buses).

The communications manager 720 may support wireless communication at a first wireless communication device in accordance with examples as disclosed herein. The capability component 725 may be configured as or otherwise support a means for transmitting, to a second wireless communication device, a message including a connection establishment request and an indication of a capability of the first wireless communication device to support a value of a power efficiency threshold. The power efficiency component 730 may be configured as or otherwise support a means for receiving, in response to the message, signaling indicating to the first wireless communication device to use a value of a power efficiency at the first wireless communication device, the signaling including one or more parameters based on the value of the power efficiency threshold. The connection component 735 may be configured as or otherwise support a means for establishing, based on receiving the signaling, a connection with the second wireless communication device in accordance with the value of the power efficiency at the first wireless communication device.

In some examples, the reference signal component 740 may be configured as or otherwise support a means for determining the value of the power efficiency threshold based on receiving a CSI-RS, a demodulation reference signal, a downlink shared channel message, or any combination thereof.

In some examples, to support determining the value of the power efficiency threshold based on receiving the CSI-RS, the demodulation reference signal, the downlink shared channel message, or any combination thereof, the reference signal component 740 may be configured as or otherwise support a means for measuring a noise of the CSI-RS, the demodulation reference signal, the downlink shared channel message, or any combination thereof. In some examples, to support determining the value of the power efficiency threshold based on receiving the CSI-RS, the demodulation reference signal, the downlink shared channel message, or any combination thereof, the reference signal component 740 may be configured as or otherwise support a means for generating, based on the measured noise of the CSI-RS, the demodulation reference signal, the downlink shared channel message, or any combination thereof, a set of multiple transmit vectors, each transmit vector of the set of multiple transmit vectors corresponding to a set of multiple power efficiencies. In some examples, to support determining the value of the power efficiency threshold based on receiving the CSI-RS, the demodulation reference signal, the downlink shared channel message, or any combination thereof, the capability component 725 may be configured as or otherwise support a means for selecting the value of the power efficiency threshold based on comparing the set of multiple transmit vectors, where transmitting the message is based on selecting the value of the power efficiency threshold.

In some examples, the capability component 725 may be configured as or otherwise support a means for inputting, to a machine learning model, a channel estimation, a whitened channel estimation, a noise variance, a noise covariance, a doppler spread, a channel time domain impulse response, a channel after precoding, the channel before precoding, or any combination thereof. In some examples, the capability component 725 may be configured as or otherwise support a means for determining the value of the power efficiency threshold based on an output from the machine learning model.

In some examples, the capability component 725 may be configured as or otherwise support a means for determining the value of the power efficiency threshold based on accessing a look-up table with a set of multiple power consumption values, where a maximum power consumption value of the set of multiple power consumption values corresponds to the value of the power efficiency threshold.

In some examples, the one or more parameters include a first quantity of time resources to add to a set of multiple time resource allocated to a CSI-RS, a second quantity of time resources for a sleeping mode at the first wireless communication device, a time-frequency resource allocation, or any combination thereof.

In some examples, the reference signal component 740 may be configured as or otherwise support a means for receiving, using a receive power that is in accordance with the value of the power efficiency at the first wireless communication device, a CSI-RS. In some examples, the feedback report component 745 may be configured as or otherwise support a means for transmitting, to the second wireless communication device, a CSF report based on the CSI-RS.

In some examples, the message including the connection establishment request and the indication of the capability of the first wireless communication device includes a CQI report, a PMI report, a RI report, or any combination thereof.

In some examples, the message includes a MCS parameter, a CQI parameter, a MLC parameter, a number of bits per layer, a coding status of a second layer, a RI, a constellation, or any combination thereof that satisfy the value of the power efficiency threshold.

In some examples, transmitting the message includes transmitting radio resource control signaling that includes the connection establishment request and the indication of the capability of the first wireless communication device to support the value of the power efficiency threshold.

In some examples, the first wireless communication device is a UE and the second wireless communication device is a network entity.

In some examples, the first wireless communication device is a first network entity and the second wireless communication device is a second network entity.

Figure 8:
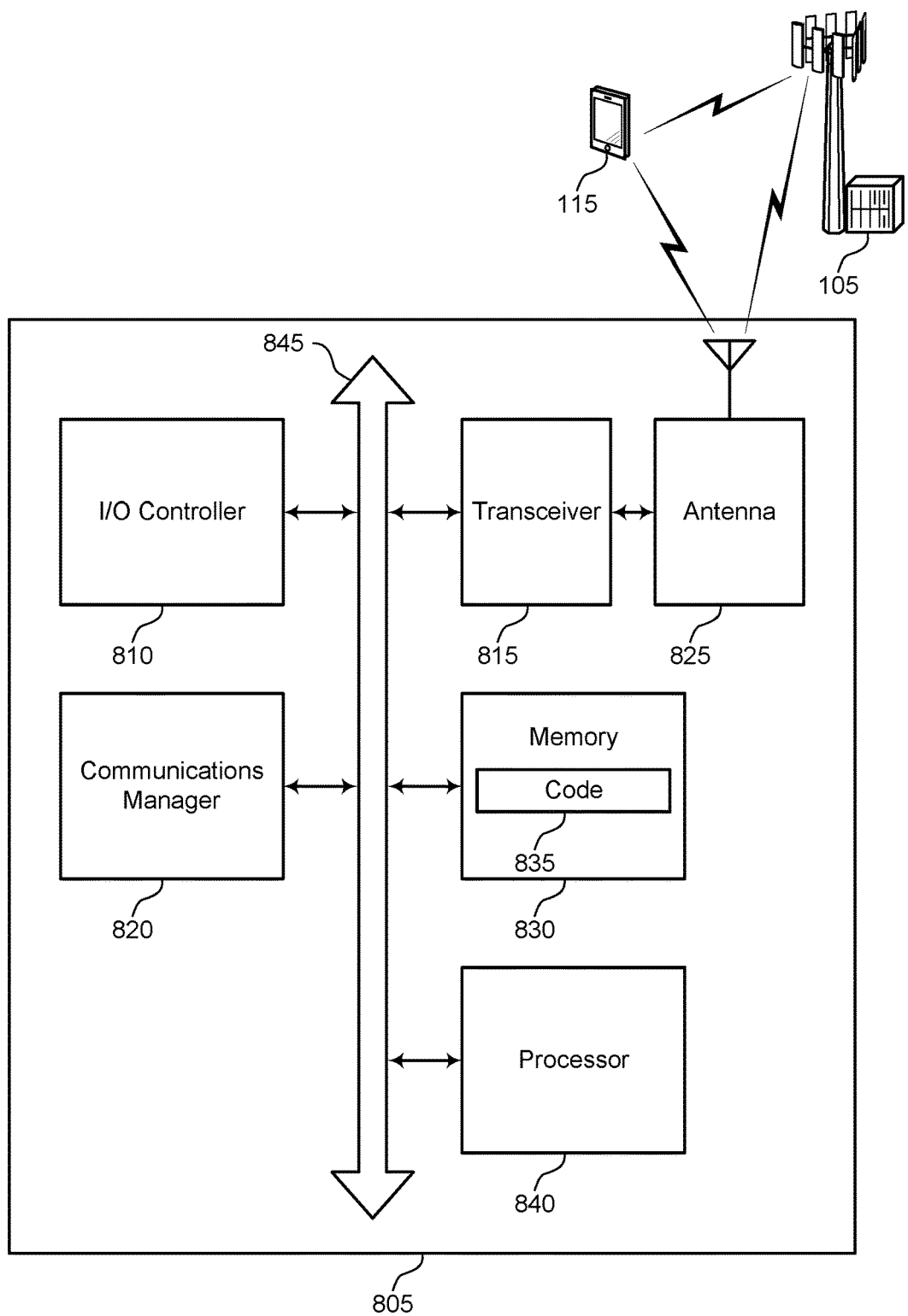
FIG. 8 shows a diagram of a system including a device that supports reporting power efficiency for communications in accordance with one or more aspects of the present disclosure.

FIG. 8 shows a diagram of a system including a device 805 that supports reporting power efficiency for communications in accordance with one or more aspects of the present disclosure. The device 805 may be an example of or include the components of a device 505, a device 605, or a UE 115 as described herein. The device 805 may communicate (for example, wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (for example, when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting reporting power efficiency for communications). For example, the device 805 or a component of the device 805 may include a processor 840 and memory 830 coupled with or to the processor 840, the processor 840 and memory 830 configured to perform various functions described herein.

The communications manager 820 may support wireless communication at a first wireless communication device in accordance with examples as disclosed herein. For example, the communications manager 820 may be configured as or otherwise support a means for transmitting, to a second wireless communication device, a message including a connection establishment request and an indication of a capability of the first wireless communication device to support a value of a power efficiency threshold. The communications manager 820 may be configured as or otherwise support a means for receiving, in response to the message, signaling indicating to the first wireless communication device to use a value of a power efficiency at the first wireless communication device, the signaling including one or more parameters based on the value of the power efficiency threshold. The communications manager 820 may be configured as or otherwise support a means for establishing, based on receiving the signaling, a connection with the second wireless communication device in accordance with the value of the power efficiency at the first wireless communication device.

By including or configuring the communications manager 820 in accordance with examples as described herein, the device 805 may support techniques for a UE to transmit control information including a connection establishment request and power efficiency capability to a network entity, which may provide for reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reporting power efficiency for communications as described herein, or the processor 840 and the memory 830 may be otherwise configured to perform or support such operations.

Figure 9:
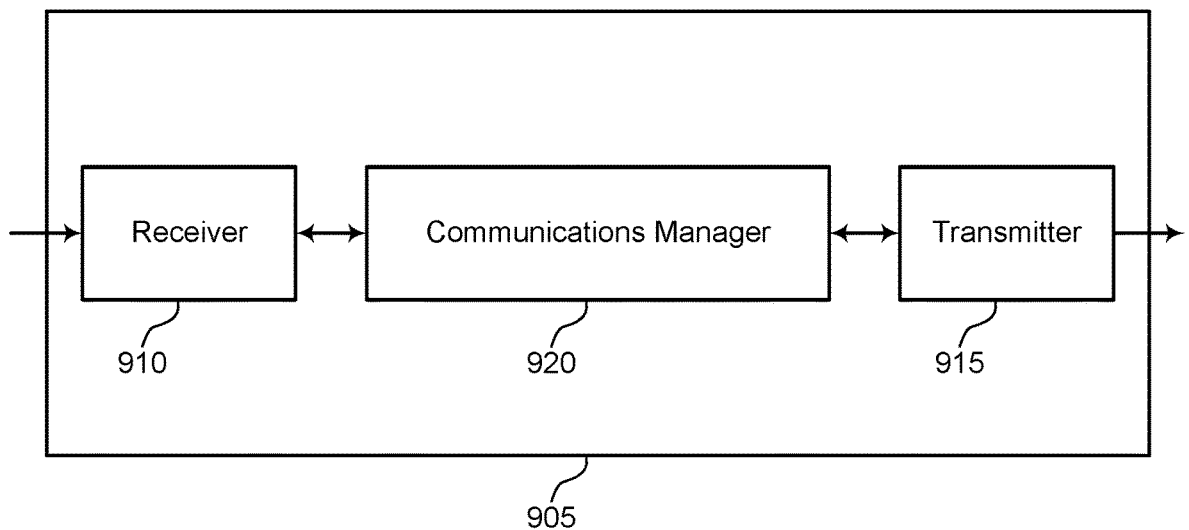
FIGS. 9 and 10 show block diagrams of devices that support reporting power efficiency for communications in accordance with one or more aspects of the present disclosure.

FIG. 9 shows a block diagram of a device 905 that supports reporting power efficiency for communications in accordance with one or more aspects of the present disclosure. The device 905 may be an example of aspects of a network entity 105 as described herein. The device 905 may include a receiver 910, a transmitter 915, and a communications manager 920. The communications manager 920 can be implemented, at least in part, by one or both of a modem and a processor Each of these components may be in communication with one another (for example, via one or more buses).

The receiver 910 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (for example, electrical, fiber optic) interfaces, wireless interfaces, or any combination thereof.

The transmitter 915 may provide a means for outputting (for example, transmitting, providing, conveying, sending) information generated by other components of the device 905. For example, the transmitter 915 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (for example, electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reporting power efficiency for communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (for example, in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 920, the receiver 910, the transmitter 915, or various combinations or components thereof may be implemented in code (for example, as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 920 may be configured to perform various operations (for example, receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first wireless communication device in accordance with examples as disclosed herein. For example, the communications manager 920 may be configured as or otherwise support a means for receiving, from a second wireless communication device, a message including a connection establishment request and an indication of a capability of the second wireless communication device to support a value of a power efficiency threshold. The communications manager 920 may be configured as or otherwise support a means for transmitting, in response to the message, signaling indicating to the second wireless communication device to use a value of a power efficiency at the second wireless communication device, the signaling including one or more parameters based on the value of the power efficiency threshold. The communications manager 920 may be configured as or otherwise support a means for establishing, based on transmitting the signaling, a connection with the second wireless communication device in accordance with the value of the power efficiency at the second wireless communication device.

By including or configuring the communications manager 920 in accordance with examples as described herein, the device 905 (for example, a processor controlling or otherwise coupled with the receiver 910, the transmitter 915, the communications manager 920, or a combination thereof) may support techniques for a UE to transmit control information including a connection establishment request and power efficiency capability to a network entity, which may provide for reduced power consumption, more efficient utilization of communication resources, and the like.

Figure 10:
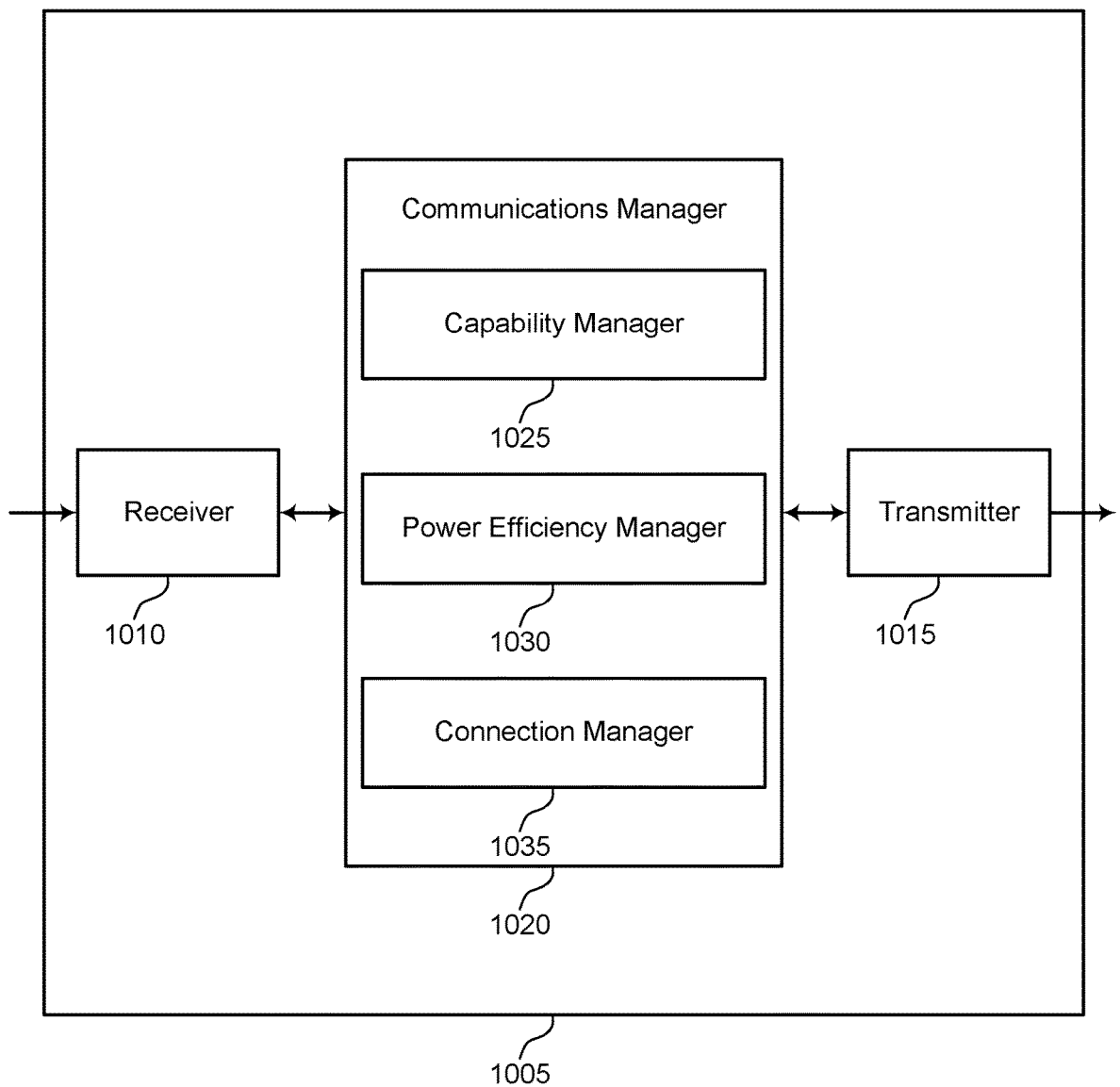

FIG. 10 shows a block diagram of a device 1005 that supports reporting power efficiency for communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (for example, electrical, fiber optic) interfaces, wireless interfaces, or any combination thereof The transmitter 1015 may provide a means for outputting (for example, transmitting, providing, conveying, sending) information generated by other components of the device 1005. For example, the transmitter 1015 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (for example, electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reporting power efficiency for communications as described herein. For example, the communications manager 1020 may include a capability manager 1025, a power efficiency manager 1030, a connection manager 1035, or any combination thereof. In some examples, the communications manager 1020, or various components thereof, may be configured to perform various operations (for example, receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first wireless communication device in accordance with examples as disclosed herein. The capability manager 1025 may be configured as or otherwise support a means for receiving, from a second wireless communication device, a message including a connection establishment request and an indication of a capability of the second wireless communication device to support a value of a power efficiency threshold. The power efficiency manager 1030 may be configured as or otherwise support a means for transmitting, in response to the message, signaling indicating to the second wireless communication device to use a value of a power efficiency at the second wireless communication device, the signaling including one or more parameters based on the value of the power efficiency threshold. The connection manager 1035 may be configured as or otherwise support a means for establishing, based on transmitting the signaling, a connection with the second wireless communication device in accordance with the value of the power efficiency at the second wireless communication device.

Figure 11:
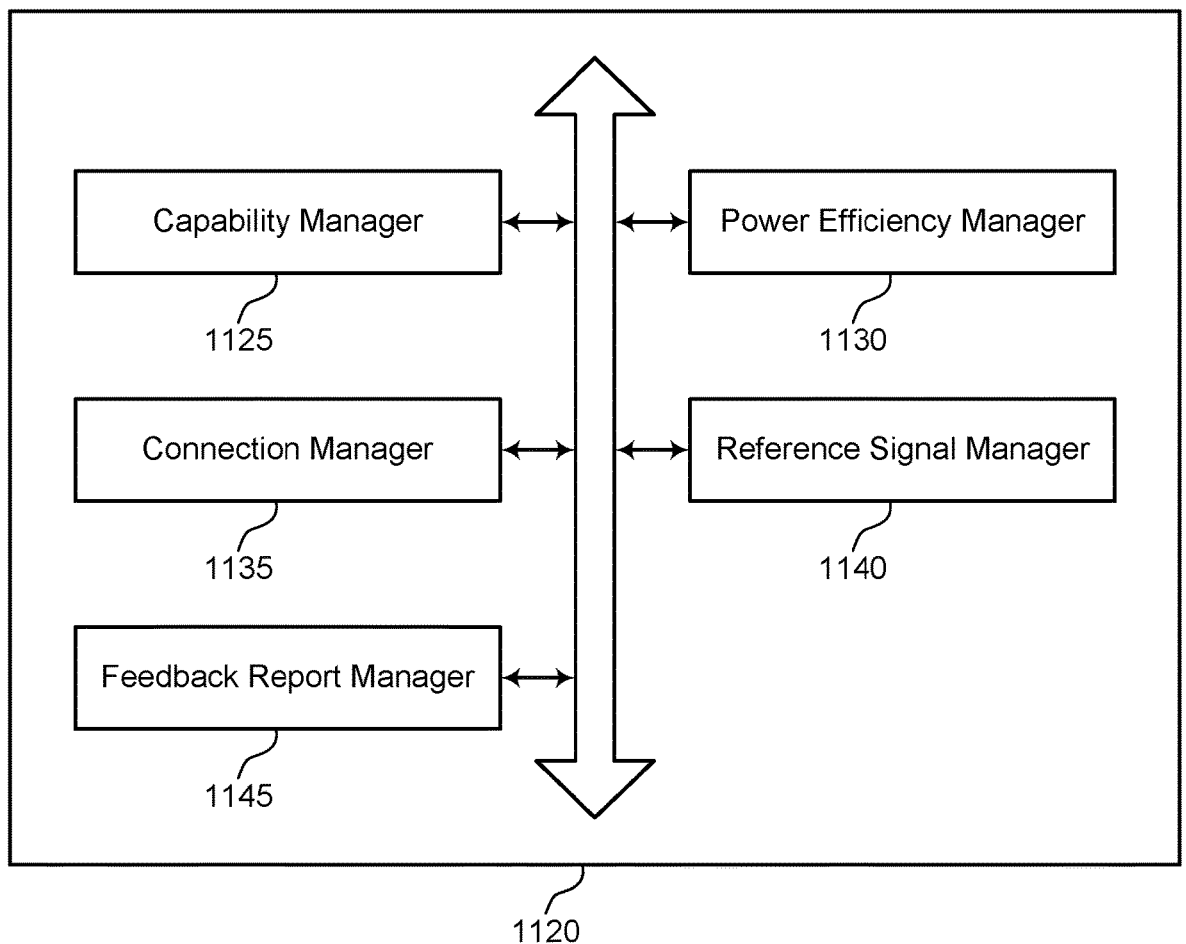
FIG. 11 shows a block diagram of a communications manager that supports reporting power efficiency for communications in accordance with one or more aspects of the present disclosure.

FIG. 11 shows a block diagram of a communications manager 1120 that supports reporting power efficiency for communications in accordance with one or more aspects of the present disclosure. The communications manager 1120, or various components thereof, may be an example of means for performing various aspects of reporting power efficiency for communications as described herein. For example, the communications manager 1120 may include a capability manager 1125, a power efficiency manager 1130, a connection manager 1135, a reference signal manager 1140, a feedback report manager 1145, or any combination thereof. Each of these components may communicate, directly or indirectly, with one another (for example, via one or more buses) which may include communications within a protocol layer of a protocol stack, communications associated with a logical channel of a protocol stack (for example, between protocol layers of a protocol stack, within a device, component, or virtualized component associated with a network entity 105, between devices, components, or virtualized components associated with a network entity 105), or any combination thereof.

The communications manager 1120 may support wireless communication at a first wireless communication device in accordance with examples as disclosed herein. The capability manager 1125 may be configured as or otherwise support a means for receiving, from a second wireless communication device, a message including a connection establishment request and an indication of a capability of the second wireless communication device to support a value of a power efficiency threshold. The power efficiency manager 1130 may be configured as or otherwise support a means for transmitting, in response to the message, signaling indicating to the second wireless communication device to use a value of a power efficiency at the second wireless communication device, the signaling including one or more parameters based on the value of the power efficiency threshold. The connection manager 1135 may be configured as or otherwise support a means for establishing, based on transmitting the signaling, a connection with the second wireless communication device in accordance with the value of the power efficiency at the second wireless communication device.

In some examples, the power efficiency manager 1130 may be configured as or otherwise support a means for determining the power efficiency at the second wireless communication device based on selecting a MLC scheme to maximize the power efficiency in accordance with the value of the power efficiency threshold.

In some examples, the one or more parameters include a first quantity of time resources to add to a set of multiple time resource allocated to a CSI-RS, a second quantity of time resources for a sleeping mode at the first wireless communication device, a time-frequency resource allocation, or any combination thereof.

In some examples, the reference signal manager 1140 may be configured as or otherwise support a means for transmitting, using a transmit power that is in accordance with the value of the power efficiency at the first wireless communication device, a CSI-RS. In some examples, the feedback report manager 1145 may be configured as or otherwise support a means for receiving, from the first wireless communication device, a CSF report based on the CSI-RS.

In some examples, the message including the connection establishment request and the indication of the capability of the first wireless communication device includes a CQI report, a PMI report, a RI report, or any combination thereof.

In some examples, the message includes a MCS parameter, a CQI parameter, a MLC parameter, a number of bits per layer, a coding status of a second layer, a RI, a constellation, or any combination thereof that satisfy the value of the power efficiency threshold.

In some examples, receiving the message includes receiving radio resource control signaling that includes the connection establishment request and the indication of the capability of the first wireless communication device to support the value of the power efficiency threshold.

In some examples, the second wireless communication device is a UE and the first wireless communication device is a network entity.

In some examples, the first wireless communication device is a first network entity and the second wireless communication device is a second network entity.

Figure 12:
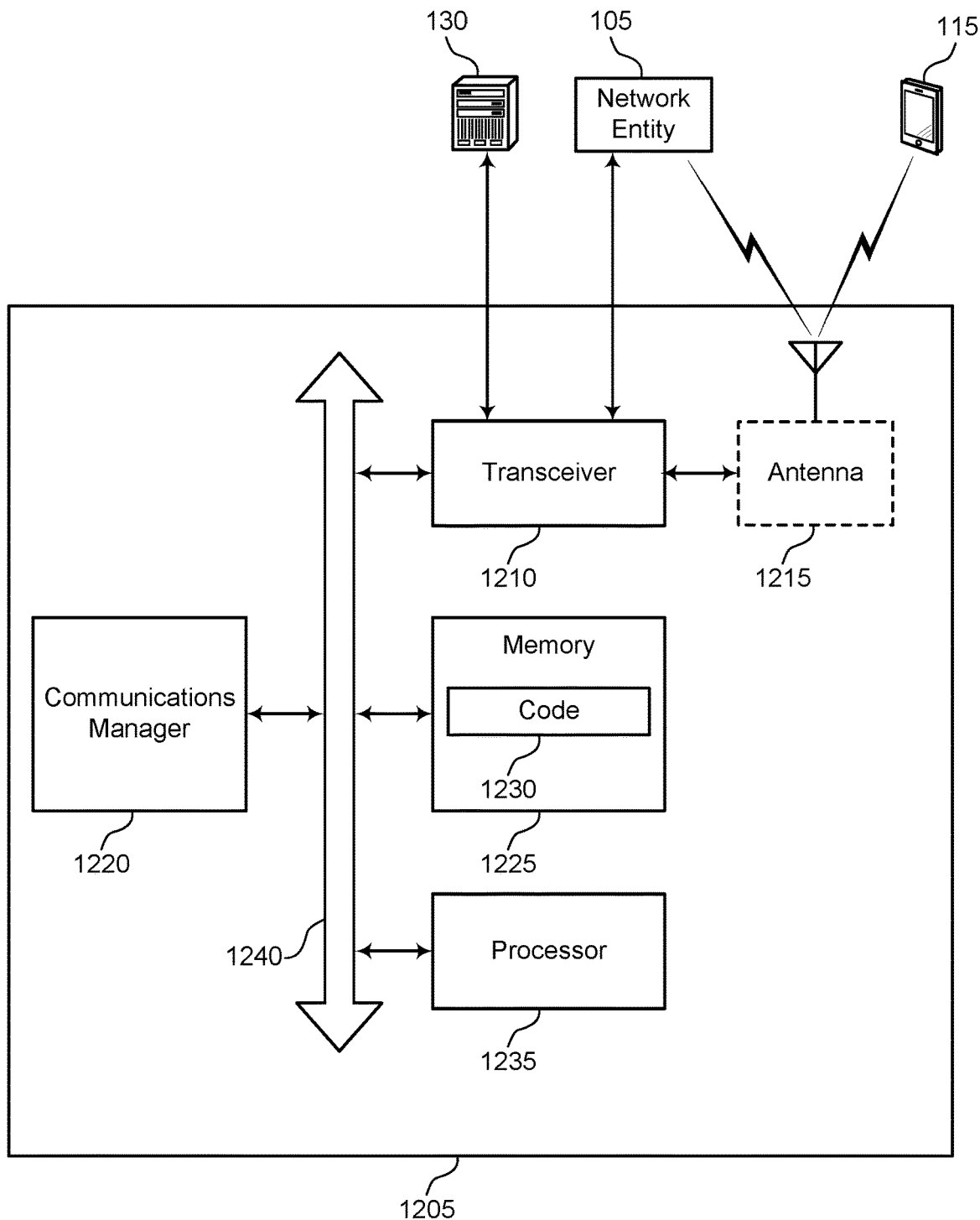
FIG. 12 shows a diagram of a system including a device that supports reporting power efficiency for communications in accordance with one or more aspects of the present disclosure.

FIG. 12 shows a diagram of a system including a device 1205 that supports reporting power efficiency for communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (for example, operatively, communicatively, functionally, electronically, electrically) via one or more buses (for example, a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (for example, concurrently). The transceiver 1210 may also include a modem to modulate signals, to provide the modulated signals for transmission (for example, by one or more antennas 1215, by a wired transmitter), to receive modulated signals (for example, from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (for example, a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (for example, when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (for example, the memory 1225) to cause the device 1205 to perform various functions (for example, functions or tasks supporting reporting power efficiency for communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (for example, one or more physical nodes and supporting software such as operating systems, virtual machines, or container instances) that may host the functions (for example, by executing code 1230) to perform the functions of the device 1205.

In some examples, a bus 1240 may support communications of (for example, within) a protocol layer of a protocol stack. In some examples, a bus 1240 may support communications associated with a logical channel of a protocol stack (for example, between protocol layers of a protocol stack), which may include communications performed within a component of the device 1205, or between different components of the device 1205 that may be co-located or located in different locations (for example, where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (for example, via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a first wireless communication device in accordance with examples as disclosed herein. For example, the communications manager 1220 may be configured as or otherwise support a means for receiving, from a second wireless communication device, a message including a connection establishment request and an indication of a capability of the second wireless communication device to support a value of a power efficiency threshold. The communications manager 1220 may be configured as or otherwise support a means for transmitting, in response to the message, signaling indicating to the second wireless communication device to use a value of a power efficiency at the second wireless communication device, the signaling including one or more parameters based on the value of the power efficiency threshold. The communications manager 1220 may be configured as or otherwise support a means for establishing, based on transmitting the signaling, a connection with the second wireless communication device in accordance with the value of the power efficiency at the second wireless communication device.

By including or configuring the communications manager 1220 in accordance with examples as described herein, the device 1205 may support techniques for a UE to transmit control information including a connection establishment request and power efficiency capability to a network entity, which may provide for reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (for example, receiving, obtaining, monitoring, outputting, transmitting) using or otherwise in cooperation with the transceiver 1210, the one or more antennas 1215 (for example, where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of reporting power efficiency for communications as described herein, or the processor 1235 and the memory 1225 may be otherwise configured to perform or support such operations.

Figure 13:
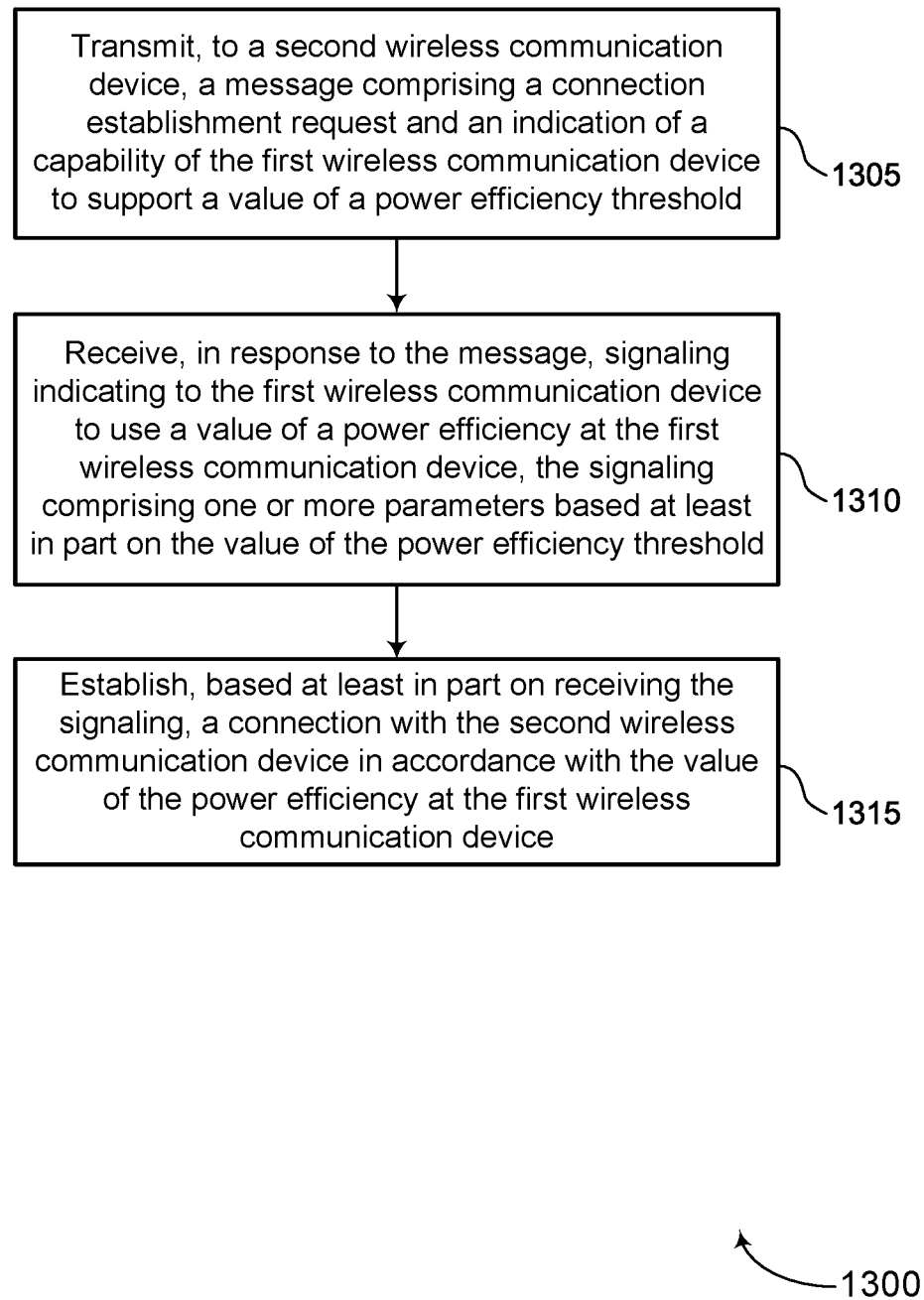
FIGS. 13-17 show flowcharts illustrating methods that support reporting power efficiency for communications in accordance with one or more aspects of the present disclosure.

FIG. 13 shows a flowchart illustrating a method 1300 that supports reporting power efficiency for communications in accordance with one or more aspects of the present disclosure. The operations of the method 1300 may be implemented by a UE or its components as described herein. For example, the operations of the method 1300 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1305, the method may include transmitting, to a second wireless communication device, a message including a connection establishment request and an indication of a capability of the first wireless communication device to support a value of a power efficiency threshold. The operations of 1305 may be performed in accordance with examples as disclosed herein. In some examples, aspects of the operations of 1305 may be performed by a capability component as described with reference to FIG. 7.

At 1310, the method may include receiving, in response to the message, signaling indicating to the first wireless communication device to use a value of a power efficiency at the first wireless communication device, the signaling including one or more parameters based on the value of the power efficiency threshold. The operations of 1310 may be performed in accordance with examples as disclosed herein. In some examples, aspects of the operations of 1310 may be performed by a power efficiency component as described with reference to FIG. 7.

At 1315, the method may include establishing, based on receiving the signaling, a connection with the second wireless communication device in accordance with the value of the power efficiency at the first wireless communication device. The operations of 1315 may be performed in accordance with examples as disclosed herein. In some examples, aspects of the operations of 1315 may be performed by a connection component as described with reference to FIG. 7.

Figure 14:
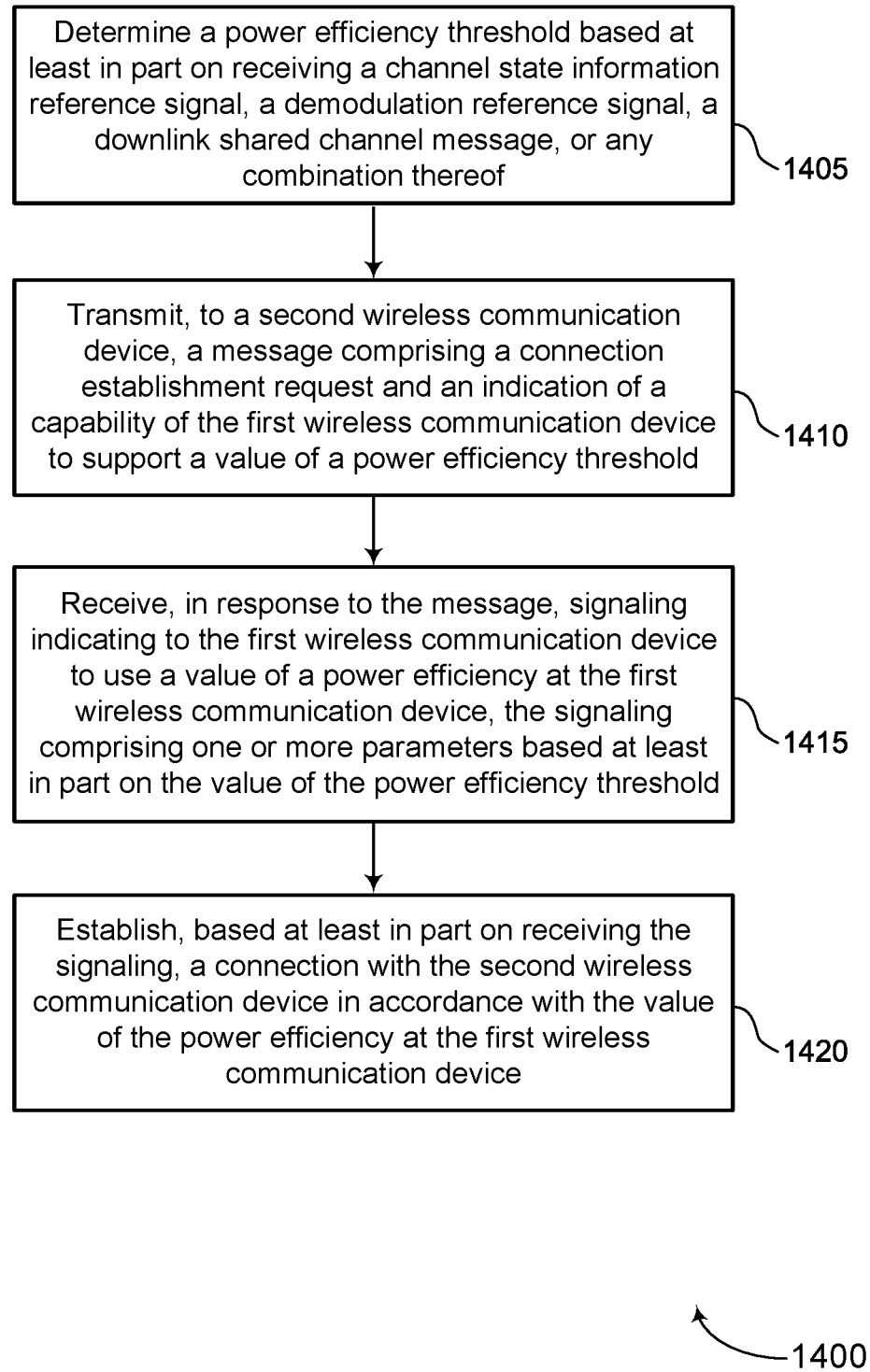

FIG. 14 shows a flowchart illustrating a method 1400 that supports reporting power efficiency for communications in accordance with one or more aspects of the present disclosure. The operations of the method 1400 may be implemented by a UE or its components as described herein. For example, the operations of the method 1400 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1405, the method may include determining a power efficiency threshold based on receiving a CSI-RS, a DMRS, a downlink shared channel message, or any combination thereof. The operations of 1405 may be performed in accordance with examples as disclosed herein. In some examples, aspects of the operations of 1405 may be performed by a reference signal component as described with reference to FIG. 7.

At 1410, the method may include transmitting, to a second wireless communication device, a message including a connection establishment request and an indication of a capability of the first wireless communication device to support a value of the value of the power efficiency threshold. The operations of 1410 may be performed in accordance with examples as disclosed herein. In some examples, aspects of the operations of 1410 may be performed by a capability component as described with reference to FIG. 7.

At 1415, the method may include receiving, in response to the message, signaling indicating to the first wireless communication device to use a value of a power efficiency at the first wireless communication device, the signaling including one or more parameters based on the value of the power efficiency threshold. The operations of 1415 may be performed in accordance with examples as disclosed herein. In some examples, aspects of the operations of 1415 may be performed by a power efficiency component as described with reference to FIG. 7.

At 1420, the method may include establishing, based on receiving the signaling, a connection with the second wireless communication device in accordance with the value of the power efficiency at the first wireless communication device. The operations of 1420 may be performed in accordance with examples as disclosed herein. In some examples, aspects of the operations of 1420 may be performed by a connection component as described with reference to FIG. 7.

Figure 15:
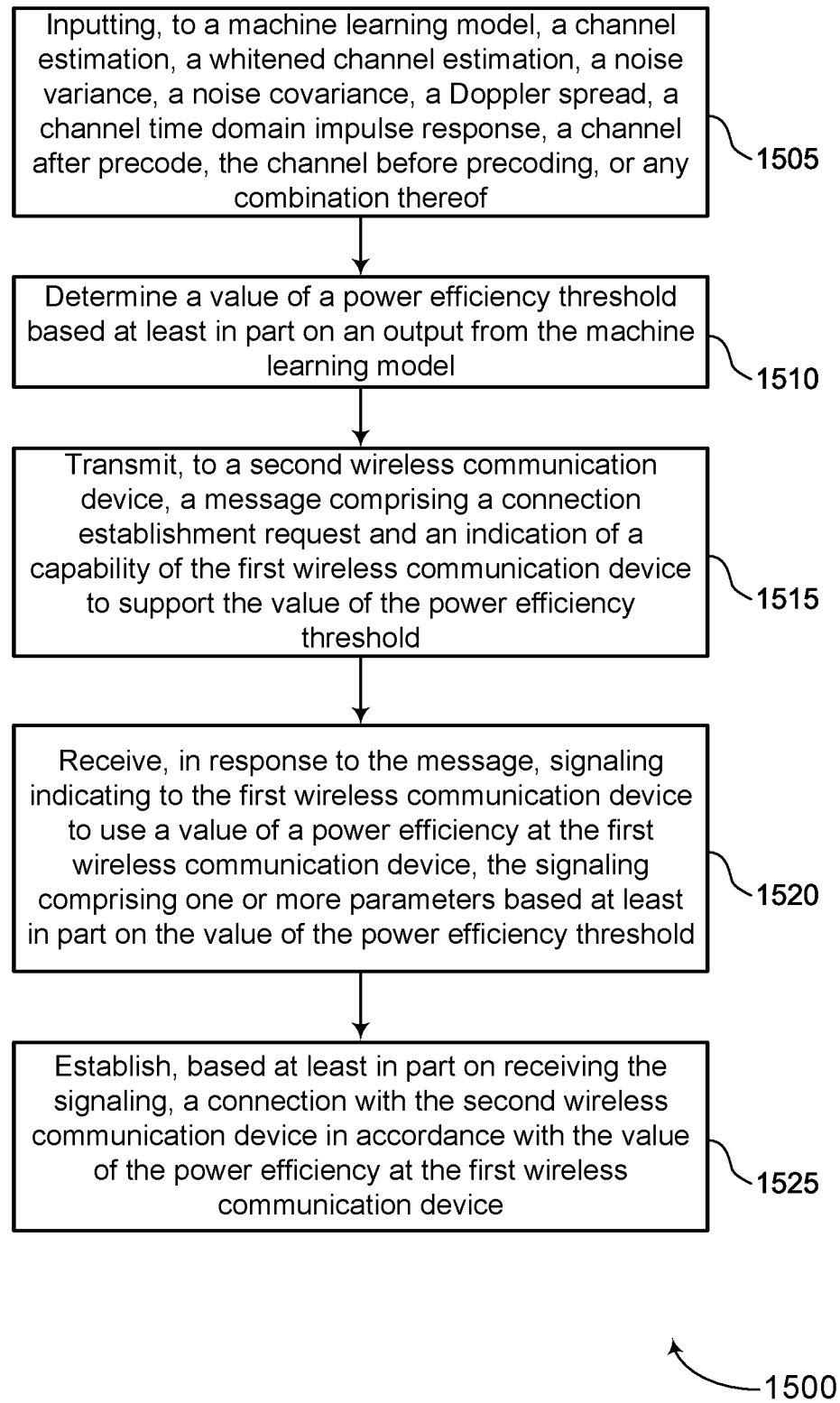

FIG. 15 shows a flowchart illustrating a method 1500 that supports reporting power efficiency for communications in accordance with one or more aspects of the present disclosure. The operations of the method 1500 may be implemented by a UE or its components as described herein. For example, the operations of the method 1500 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1505, the method may include inputting, to a machine learning model, a channel estimation, a whitened channel estimation, a noise variance, a noise covariance, a Doppler spread, a channel time domain impulse response, a channel after precoding, the channel before precoding, or any combination thereof. The operations of 1505 may be performed in accordance with examples as disclosed herein. In some examples, aspects of the operations of 1505 may be performed by a capability component as described with reference to FIG. 7.

At 1510, the method may include determining a value of a power efficiency threshold based on an output from the machine learning model. The operations of 1510 may be performed in accordance with examples as disclosed herein. In some examples, aspects of the operations of 1510 may be performed by a capability component as described with reference to FIG. 7.

At 1515, the method may include transmitting, to a second wireless communication device, a message including a connection establishment request and an indication of a capability of the first wireless communication device to support the value of the power efficiency threshold. The operations of 1515 may be performed in accordance with examples as disclosed herein. In some examples, aspects of the operations of 1515 may be performed by a capability component as described with reference to FIG. 7.

At 1520, the method may include receiving, in response to the message, signaling indicating to the first wireless communication device to use a value of a power efficiency at the first wireless communication device, the signaling including one or more parameters based on the value of the power efficiency threshold. The operations of 1520 may be performed in accordance with examples as disclosed herein. In some examples, aspects of the operations of 1520 may be performed by a power efficiency component as described with reference to FIG. 7.

At 1525, the method may include establishing, based on receiving the signaling, a connection with the second wireless communication device in accordance with the value of the power efficiency at the first wireless communication device. The operations of 1525 may be performed in accordance with examples as disclosed herein. In some examples, aspects of the operations of 1525 may be performed by a connection component as described with reference to FIG. 7.

Figure 16:
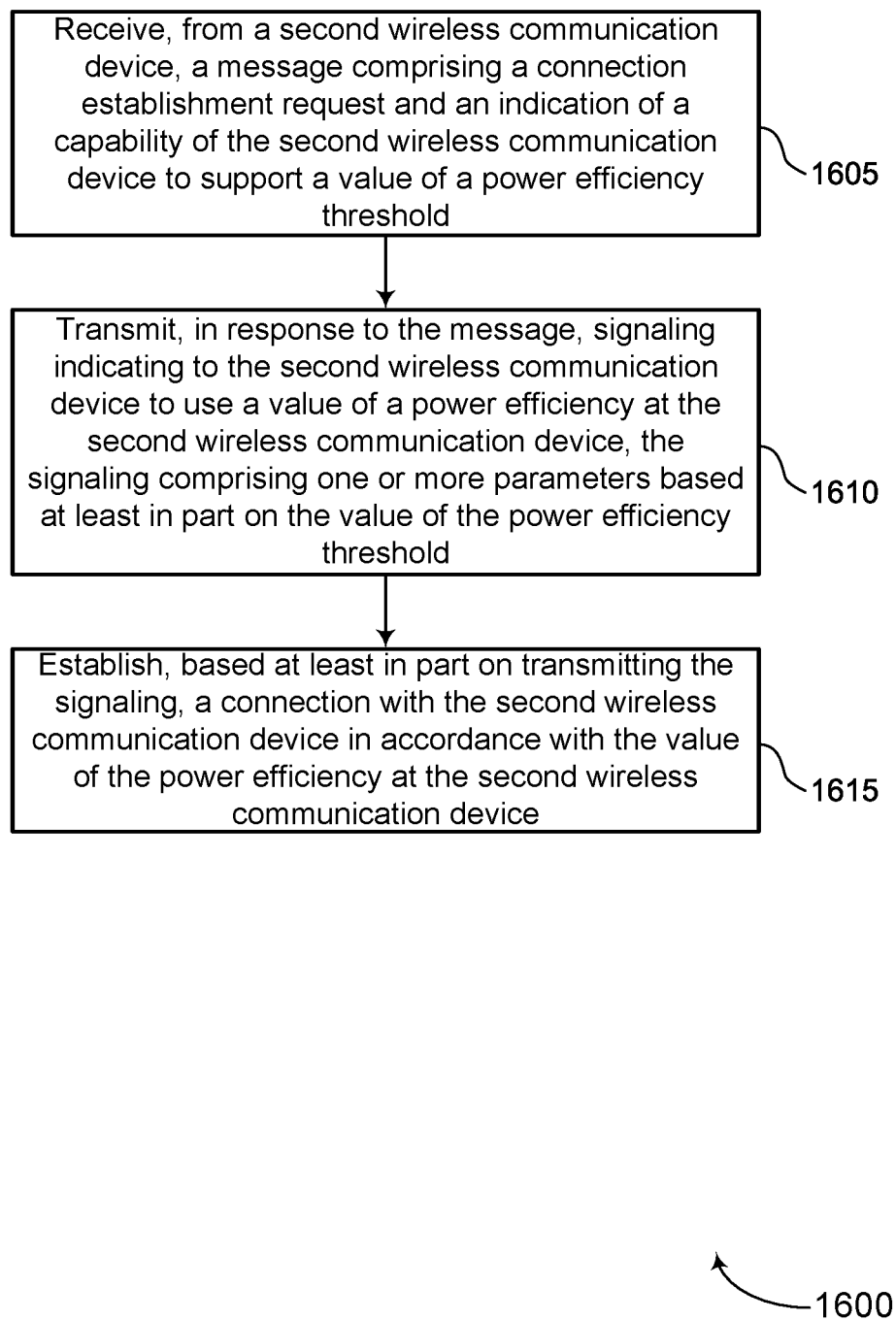

FIG. 16 shows a flowchart illustrating a method 1600 that supports reporting power efficiency for communications in accordance with one or more aspects of the present disclosure. The operations of the method 1600 may be implemented by a network entity or its components as described herein. For example, the operations of the method 1600 may be performed by a network entity as described with reference to FIGS. 1-4 and 9-12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a second wireless communication device, a message including a connection establishment request and an indication of a capability of the second wireless communication device to support a value of a power efficiency threshold. The operations of 1605 may be performed in accordance with examples as disclosed herein. In some examples, aspects of the operations of 1605 may be performed by a capability manager as described with reference to FIG. 11.

At 1610, the method may include transmitting, in response to the message, signaling indicating to the second wireless communication device to use a value of a power efficiency at the second wireless communication device, the signaling including one or more parameters based on the value of the power efficiency threshold. The operations of 1610 may be performed in accordance with examples as disclosed herein. In some examples, aspects of the operations of 1610 may be performed by a power efficiency manager as described with reference to FIG. 11.

At 1615, the method may include establishing, based on transmitting the signaling, a connection with the second wireless communication device in accordance with the value of the power efficiency at the second wireless communication device. The operations of 1615 may be performed in accordance with examples as disclosed herein. In some examples, aspects of the operations of 1615 may be performed by a connection manager as described with reference to FIG. 11.

Figure 17:
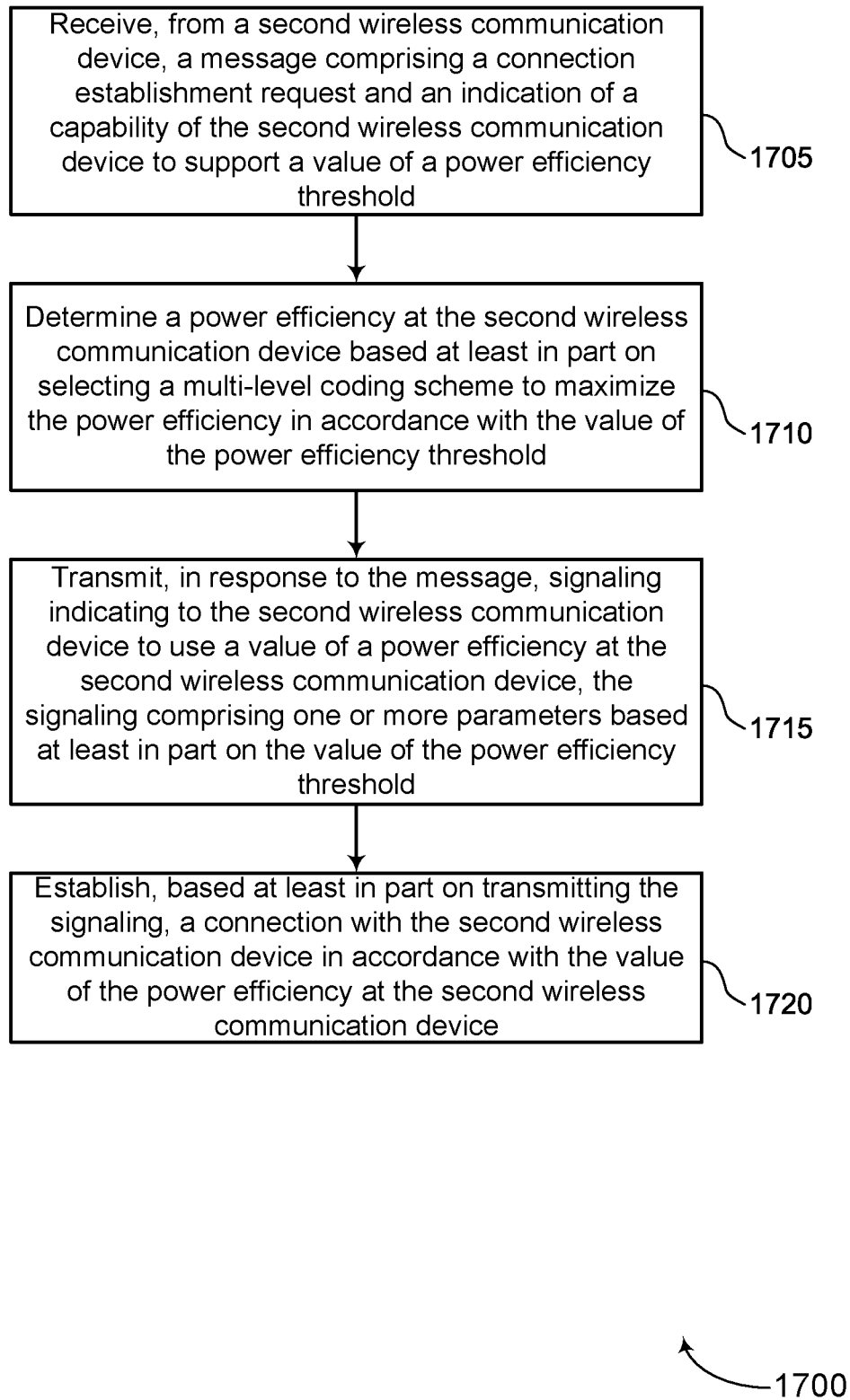

FIG. 17 shows a flowchart illustrating a method 1700 that supports reporting power efficiency for communications in accordance with one or more aspects of the present disclosure. The operations of the method 1700 may be implemented by a network entity or its components as described herein. For example, the operations of the method 1700 may be performed by a network entity as described with reference to FIGS. 1-4 and 9-12. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a second wireless communication device, a message including a connection establishment request and an indication of a capability of the second wireless communication device to support a value of a power efficiency threshold. The operations of 1705 may be performed in accordance with examples as disclosed herein. In some examples, aspects of the operations of 1705 may be performed by a capability manager as described with reference to FIG. 11.

At 1710, the method may include determining a power efficiency at the second wireless communication device based on selecting a MLC to maximize the power efficiency in accordance with the value of the power efficiency threshold. The operations of 1710 may be performed in accordance with examples as disclosed herein. In some examples, aspects of the operations of 1710 may be performed by a power efficiency manager as described with reference to FIG. 11.

At 1715, the method may include transmitting, in response to the message, signaling indicating to the second wireless communication device to use a value of the power efficiency at the second wireless communication device, the signaling including one or more parameters based on the value of the power efficiency threshold. The operations of 1715 may be performed in accordance with examples as disclosed herein. In some examples, aspects of the operations of 1715 may be performed by a power efficiency manager as described with reference to FIG. 11.

At 1720, the method may include establishing, based on transmitting the signaling, a connection with the second wireless communication device in accordance with the value of the power efficiency at the second wireless communication device. The operations of 1720 may be performed in accordance with examples as disclosed herein. In some examples, aspects of the operations of 1720 may be performed by a connection manager as described with reference to FIG. 11.

The following provides an overview of aspects of the present disclosure:

Aspect 1: A method for wireless communication at a first wireless communication device, comprising: transmitting, to a second wireless communication device, a message comprising a connection establishment request and an indication of a capability of the first wireless communication device to support a value of a power efficiency threshold; receiving, in response to the message, signaling indicating to the first wireless communication device to use a value of a power efficiency at the first wireless communication device, the signaling comprising one or more parameters based at least in part on the value of the power efficiency threshold; and establishing, based at least in part on receiving the signaling, a connection with the second wireless communication device in accordance with the value of the power efficiency at the first wireless communication device.

Aspect 2: The method of aspect 1, further comprising: determining the value of the power efficiency threshold based at least in part on receiving a channel state information reference signal, a demodulation reference signal, a downlink shared channel message, or any combination thereof.

Aspect 3: The method of aspect 2, wherein determining the value of the power efficiency threshold based at least in part on receiving the channel state information reference signal, the demodulation reference signal, the downlink shared channel message, or any combination thereof, comprises: measuring a noise of the channel state information reference signal, the demodulation reference signal, the downlink shared channel message, or any combination thereof; generating, based at least in part on the measured noise of the channel state information reference signal, the demodulation reference signal, the downlink shared channel message, or any combination thereof, a plurality of transmit vectors, each transmit vector of the plurality of transmit vectors corresponding to a plurality of power efficiencies; and selecting the value of the power efficiency threshold based at least in part on comparing the plurality of transmit vectors, wherein transmitting the message is based at least in part on selecting the value of the power efficiency threshold.

Aspect 4: The method of any of aspects 1 through 3, further comprising: inputting, to a machine learning model, a channel estimation, a whitened channel estimation, a noise variance, a noise covariance, a doppler spread, a channel time domain impulse response, a channel after precoding, the channel before precoding, or any combination thereof; and determining the value of the power efficiency threshold based at least in part on an output from the machine learning model.

Aspect 5: The method of any of aspects 1 through 4, further comprising: determining the value of the power efficiency threshold based at least in part on accessing a look-up table with a plurality of power consumption values, wherein a maximum power consumption value of the plurality of power consumption values corresponds to the value of the power efficiency threshold.

Aspect 6: The method of any of aspects 1 through 5, wherein the one or more parameters comprise a first quantity of time resources to add to a plurality of time resource allocated to a channel state information reference signal, a second quantity of time resources for a sleeping mode at the first wireless communication device, a time-frequency resource allocation, or any combination thereof.

Aspect 7: The method of any of aspects 1 through 6, further comprising: receiving, using a receive power that is in accordance with the value of the power efficiency at the first wireless communication device, a channel state information reference signal; and transmitting, to the second wireless communication device, a channel state feedback report based at least in part on the channel state information reference signal.

Aspect 8: The method of any of aspects 1 through 7, wherein the message comprising the connection establishment request and the indication of the capability of the first wireless communication device comprises a channel quality indicator report, a precoding matrix indicator report, a rank indicator report, or any combination thereof.

Aspect 9: The method of any of aspects 1 through 7, wherein the message comprises a modulation and coding scheme parameter, a channel quality indicator parameter, a multi-level coding parameter, a number of bits per layer, a coding status of a second layer, a rank indicator, a constellation, or any combination thereof that satisfy the value of the power efficiency threshold.

Aspect 10: The method of any of aspects 1 through 9, wherein transmitting the message comprises transmitting radio resource control signaling that comprises the connection establishment request and the indication of the capability of the first wireless communication device to support the value of the power efficiency threshold.

Aspect 11: The method of any of aspects 1 through 10, wherein the first wireless communication device is a UE and the second wireless communication device is a network entity.

Aspect 12: The method of any of aspects 1 through 10, wherein the first wireless communication device is a first network entity and the second wireless communication device is a second network entity.

Aspect 13: A method for wireless communication at a first wireless communication device, comprising: receiving, from a second wireless communication device, a message comprising a connection establishment request and an indication of a capability of the second wireless communication device to support a value of a power efficiency threshold; transmitting, in response to the message, signaling indicating to the second wireless communication device to use a value of a power efficiency at the second wireless communication device, the signaling comprising one or more parameters based at least in part on the value of the power efficiency threshold; and establishing, based at least in part on transmitting the signaling, a connection with the second wireless communication device in accordance with the value of the power efficiency at the second wireless communication device.

Aspect 14: The method of aspect 13, further comprising: determining the power efficiency at the second wireless communication device based at least in part on selecting a multi-level coding scheme to maximize the power efficiency in accordance with the value of the power efficiency threshold.

Aspect 15: The method of any of aspects 13 through 14, wherein the one or more parameters comprise a first quantity of time resources to add to a plurality of time resource allocated to a channel state information reference signal, a second quantity of time resources for a sleeping mode at the first wireless communication device, a time-frequency resource allocation, or any combination thereof.

Aspect 16: The method of any of aspects 13 through 15, further comprising: transmitting, using a transmit power that is in accordance with the value of the power efficiency at the first wireless communication device, a channel state information reference signal; and receiving, from the first wireless communication device, a channel state feedback report based at least in part on the channel state information reference signal.

Aspect 17: The method of any of aspects 13 through 16, wherein the message comprising the connection establishment request and the indication of the capability of the first wireless communication device comprises a channel quality indicator report, a precoding matrix indicator report, a rank indicator report, or any combination thereof.

Aspect 18: The method of any of aspects 13 through 16, wherein the message comprises a modulation and coding scheme parameter, a channel quality indicator parameter, a multi-level coding parameter, a number of bits per layer, a coding status of a second layer, a rank indicator, a constellation, or any combination thereof that satisfy the value of the power efficiency threshold.

Aspect 19: The method of any of aspects 13 through 18, wherein receiving the message comprises receiving radio resource control signaling that comprises the connection establishment request and the indication of the capability of the first wireless communication device to support the value of the power efficiency threshold.

Aspect 20: The method of any of aspects 13 through 19, wherein the second wireless communication device is a UE and the first wireless communication device is a network entity.

Aspect 21: The method of any of aspects 13 through 19, wherein the first wireless communication device is a first network entity and the second wireless communication device is a second network entity.

Aspect 22: An apparatus for wireless communication at a first wireless communication device, comprising a processor; memory coupled with the processor; and instructions stored in the memory and executable by the processor to cause the apparatus to perform a method of any of aspects 1 through 12.

Aspect 23: An apparatus for wireless communication at a first wireless communication device, comprising at least one means for performing a method of any of aspects 1 through 12.

Aspect 24: A non-transitory computer-readable medium storing code for wireless communication at a first wireless communication device, the code comprising instructions executable by a processor to perform a method of any of aspects 1 through 12.

Aspect 25: An apparatus for wireless communication at a first wireless communication device, comprising a processor; memory coupled with the processor; and instructions stored in the memory and executable by the processor to cause the apparatus to perform a method of any of aspects 13 through 21.

Aspect 26: An apparatus for wireless communication at a first wireless communication device, comprising at least one means for performing a method of any of aspects 13 through 21.

Aspect 27: A non-transitory computer-readable medium storing code for wireless communication at a first wireless communication device, the code comprising instructions executable by a processor to perform a method of any of aspects 13 through 21.

It should be noted that the methods described herein describe possible implementations, and that the operations and the features may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example feature that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a first wireless communication device, comprising:
    transmitting, to a second wireless communication device, a message comprising a connection establishment request and an indication of a capability of the first wireless communication device to support a value of a power efficiency threshold for a connection between the first wireless communication device and the second wireless communication device;
    receiving, in response to the message, signaling indicating to the first wireless communication device to use a value of a power efficiency at the first wireless communication device, the signaling comprising one or more parameters for the connection based at least in part on the value of the power efficiency threshold; and
    establishing, based at least in part on receiving the signaling, the connection with the second wireless communication device in accordance with the value of the power efficiency at the first wireless communication device.

2. The method of claim 1, further comprising determining the value of the power efficiency threshold based at least in part on receiving a channel state information-reference signal, a demodulation reference signal, a downlink shared channel message, or any combination thereof.

3. The method of claim 2, wherein determining the value of the power efficiency threshold based at least in part on receiving the channel state information-reference signal, the demodulation reference signal, the downlink shared channel message, or any combination thereof, comprises:
    measuring a noise of the channel state information-reference signal, the demodulation reference signal, the downlink shared channel message, or any combination thereof;
    generating, based at least in part on the measured noise of the channel state information-reference signal, the demodulation reference signal, the downlink shared channel message, or any combination thereof, a plurality of transmit vectors, each transmit vector of the plurality of transmit vectors corresponding to a plurality of power efficiencies; and selecting the value of the power efficiency threshold based at least in part on comparing the plurality of transmit vectors, wherein transmitting the message is based at least in part on selecting the value of the power efficiency threshold.

4. The method of claim 1, further comprising:
inputting, to a machine learning model, a channel estimation, a whitened channel estimation, a noise variance, a noise covariance, a Doppler spread, a channel time domain impulse response, a channel after precoding, the channel before precoding, or any combination thereof; and
determining the value of the power efficiency threshold based at least in part on an output from the machine learning model.

5. The method of claim 1, further comprising determining the value of the power efficiency threshold based at least in part on accessing a look-up table with a plurality of power consumption values, wherein a maximum power consumption value of the plurality of power consumption values corresponds to the value of the power efficiency threshold.

6. The method of claim 1, wherein the one or more parameters comprise a first quantity of time resources to add to a plurality of time resource allocated to a channel state information-reference signal, a second quantity of time resources for a sleeping mode at the first wireless communication device, a time-frequency resource allocation, or any combination thereof.

7. The method of claim 1, further comprising:
receiving, using a receive power that is in accordance with the value of the power efficiency at the first wireless communication device, a channel state information-reference signal; and
transmitting, to the second wireless communication device, a channel state feedback report based at least in part on the channel state information-reference signal.

8. The method of claim 1, wherein the message comprising the connection establishment request and the indication of the capability of the first wireless communication device comprises a channel quality indicator report, a precoding matrix indicator report, a rank indicator report, or any combination thereof.

9. The method of claim 1, wherein the message comprises a modulation and coding scheme parameter, a channel quality indicator parameter, a multi-level coding parameter, a quantity of bits per layer, a coding status of a second layer, a rank indicator, a constellation, or any combination thereof that satisfy the value of the power efficiency threshold.

10. The method of claim 1, wherein transmitting the message comprises transmitting radio resource control signaling that comprises the connection establishment request and the indication of the capability of the first wireless communication device to support the value of the power efficiency threshold.

11. The method of claim 1, wherein the first wireless communication device is a user equipment (UE) and the second wireless communication device is a network entity.

12. The method of claim 1, wherein the first wireless communication device is a first network entity and the second wireless communication device is a second network entity.

13. A method for wireless communication by a first wireless communication device, comprising:

receiving, from a second wireless communication device, a message comprising a connection establishment request and an indication of a capability of the second wireless communication device to support a value of a power efficiency threshold for a connection between the first wireless communication device and the second wireless communication device;

transmitting, in response to the message, signaling indicating to the second wireless communication device to use a value of a power efficiency at the second wireless communication device, the signaling comprising one or more parameters for the connection based at least in part on the value of the power efficiency threshold; and establishing, based at least in part on transmitting the signaling, the connection with the second wireless communication device in accordance with the value of the power efficiency at the second wireless communication device.

14. The method of claim 13, further comprising determining the power efficiency at the second wireless communication device based at least in part on selecting a multi-level coding scheme to maximize the power efficiency in accordance with the value of the power efficiency threshold.

15. The method of claim 13, wherein the one or more parameters comprise a first quantity of time resources to add to a plurality of time resource allocated to a channel state information-reference signal, a second quantity of time resources for a sleeping mode at the first wireless communication device, a time-frequency resource allocation, or any combination thereof.

16. The method of claim 13, further comprising:
transmitting, using a transmit power that is in accordance with the value of the power efficiency at the first wireless communication device, a channel state information-reference signal; and
receiving, from the first wireless communication device, a channel state feedback report based at least in part on the channel state information-reference signal.

17. The method of claim 13, wherein the message comprising the connection establishment request and the indication of the capability of the first wireless communication device comprises a channel quality indicator report, a precoding matrix indicator report, a rank indicator report, or any combination thereof.

18. The method of claim 13, wherein the message comprises a modulation and coding scheme parameter, a channel quality indicator parameter, a multi-level coding parameter, a quantity of bits per layer, a coding status of a second layer, a rank indicator, a constellation, or any combination thereof that satisfy the value of the power efficiency threshold.

19. The method of claim 13, wherein receiving the message comprises receiving radio resource control signaling that comprises the connection establishment request and the indication of the capability of the first wireless communication device to support the value of the power efficiency threshold.

20. The method of claim 13, wherein the second wireless communication device is a user equipment (UE) and the first wireless communication device is a network entity.

21. The method of claim 13, wherein the first wireless communication device is a first network entity and the second wireless communication device is a second network entity.

22. A first wireless communication device, comprising:
at least one processor; and at least one memory coupled with the at least one processor and storing instructions executable by the at least one processor to cause the first wireless communication device to:
- transmit, to a second wireless communication device, a message comprising a connection establishment request and an indication of a capability of the first wireless communication device to support a value of a power efficiency threshold for a connection between the first wireless communication device and the second wireless communication device;
- receive, in response to the message, signaling indicating to the first wireless communication device to use a value of a power efficiency at the first wireless communication device, the signaling comprising one or more parameters for the connection based at least in part on the value of the power efficiency threshold; and
- establish, based at least in part on receiving the signaling, the connection with the second wireless communication device in accordance with the value of the power efficiency at the first wireless communication device.

23. The first wireless communication device of claim 22, wherein the instructions are further executable by the at least one processor to cause the first wireless communication device to determine the value of the power efficiency threshold based at least in part on receiving a channel state information-reference signal, a demodulation reference signal, a downlink shared channel message, or any combination thereof.

24. The first wireless communication device of claim 22, wherein the instructions are further executable by the at least one processor to cause the first wireless communication device to:
- inputting, to a machine learning model, a channel estimation, a whitened channel estimation, a noise variance, a noise covariance, a Doppler spread, a channel time domain impulse response, a channel after precode, the channel before precoding, or any combination thereof; and
- determine the value of the power efficiency threshold based at least in part on an output from the machine learning model.

25. The first wireless communication device of claim 22, wherein the instructions are further executable by the at least one processor to cause the first wireless communication device to determine the value of the power efficiency threshold based at least in part on accessing a look-up table with a plurality of power consumption values, wherein a maximum power consumption value of the plurality of power consumption values corresponds to the value of the power efficiency threshold.

26. The first wireless communication device of claim 22, wherein the one or more parameters comprise a first quantity of time resources to add to a plurality of time resource allocated to a channel state information-reference signal, a second quantity of time resources for a sleeping mode at the first wireless communication device, a time-frequency resource allocation, or any combination thereof.

27. The first wireless communication device of claim 22, wherein the instructions are further executable by the at least one processor to cause the first wireless communication device to:
- receive, using a receive power that is in accordance with the value of the power efficiency at the first wireless communication device, a channel state information-reference signal; and
- transmit, to the second wireless communication device, a channel state feedback report based at least in part on the channel state information-reference signal.

28. The first wireless communication device of claim 22, wherein the message comprising the connection establishment request and the indication of the capability of the first wireless communication device comprises a channel quality indicator report, a precoding matrix indicator report, a rank indicator report, or any combination thereof.

29. A first wireless communication device, comprising:
at least one processor; and
at least one memory coupled with the at least one processor and storing instructions executable by the at least one processor to cause the first wireless communication device to:
- receive, from a second wireless communication device, a message comprising a connection establishment request and an indication of a capability of the second wireless communication device to support a value of a power efficiency threshold for a connection between the first wireless communication device and the second wireless communication device;
- transmit, in response to the message, signaling indicating to the second wireless communication device to use a value of a power efficiency at the second wireless communication device, the signaling comprising one or more parameters for the connection based at least in part on the value of the power efficiency threshold; and
- establish, based at least in part on transmitting the signaling, the connection with the second wireless communication device in accordance with the value of the power efficiency at the second wireless communication device.

30. The first wireless communication device of claim 29, wherein the instructions are further executable by the at least one processor to cause the first wireless communication device to determine the power efficiency at the second wireless communication device based at least in part on selecting a multi-level coding scheme to maximize the power efficiency in accordance with the value of the power efficiency threshold.

* * * * *